United States Patent
Enjuji

(10) Patent No.: US 8,310,726 B2
(45) Date of Patent: Nov. 13, 2012

(54) IMAGE PROCESSING APPARATUS, IMAGE PROCESSING METHOD, IMAGE PROCESSING PROGRAM, AND PRINTING APPARATUS

(75) Inventor: Takayuki Enjuji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 708 days.

(21) Appl. No.: 12/474,636

(22) Filed: May 29, 2009

(65) Prior Publication Data

US 2010/0027072 A1     Feb. 4, 2010

(30) Foreign Application Priority Data

May 30, 2008   (JP) ................. 2008-142349

(51) Int. Cl.
*H04N 1/40* (2006.01)
*H04N 1/407* (2006.01)
(52) U.S. Cl. ............ 358/3.01; 358/3.27; 358/3.26; 358/538; 358/518; 358/521; 382/274; 382/190
(58) Field of Classification Search .......... 358/3.01, 358/3.27, 3.26, 538, 518, 521; 382/274, 382/190
See application file for complete search history.

(56) References Cited

U.S. PATENT DOCUMENTS

| | | | |
|---|---|---|---|
| 2008/0187184 A1* | 8/2008 | Yen | 382/118 |
| 2009/0080795 A1* | 3/2009 | Yano | 382/274 |
| 2010/0054604 A1* | 3/2010 | Kurokawa | 382/190 |

FOREIGN PATENT DOCUMENTS

| | | |
|---|---|---|
| JP | 2004-341889 | 12/2004 |
| JP | 2005-250596 | 9/2005 |
| JP | 2005-341527 | 12/2005 |
| JP | 2007-228323 | 9/2007 |

* cited by examiner

*Primary Examiner* — Madelein A Nguyen
*Assistant Examiner* — Quang N Vo
(74) *Attorney, Agent, or Firm* — Nutter McClennen & Fish LLP; John J. Penny, Jr.; Michael P. Visconti, III

(57) ABSTRACT

An image processing apparatus including a specific image detection unit detecting an area including at least a part of a specific image in an input image, a representative color calculation unit calculating a representative color of the specific image on the basis of pixels belonging to the area detected by the specific image detection unit, plural correction curve acquisition units which acquire plural correction curves resulting in gradation correction for every element color on the basis of the gradation value for every element color constituting the representative color after correction, and plural correction units which correct the gradation value for every element color in each pixel constituting the input image based on the obtained plural correction curves.

19 Claims, 17 Drawing Sheets

BACKLIGHT CORRECTION CURVE F1

TONE CURVE F2R

TONE CURVE F2G

TONE CURVE F2B

R HISTOGRAM

G HISTOGRAM

B HISTOGRAM

IMAGE PROCESSING APPARATUS, IMAGE PROCESSING METHOD, IMAGE PROCESSING PROGRAM, AND PRINTING APPARATUS

Priority is claimed under 35 U.S.C. §119 to Japanese Patent Application No. 2008-142349 filed on May 30, 2008, the disclosure of which, including the specification, drawings, and claims, is incorporated herein by reference in its entirety.

BACKGROUND OF THE INVENTION

1. Field of the Invention

The present invention relates to an image processing apparatus, an image processing method, an image processing program, and a printing apparatus.

2. Description of the Related Art

When an input image obtained from a digital still camera or the like is a so-called backlight image in which a portion of an image area is dark and a peripheral portion of the dark portion is bright, backlight correction is performed for the input image. As a technique regarding backlight correction, an image processing apparatus is known which performs brightness correction. In this case, the brightness correction is performed by determining whether or not a captured image is a backlight human image, when the captured image is a backlight human image, acquiring the luminance average value of flesh color pixels from among all the pixels constituting the image, obtaining a tone curve in which an output value when the average value is used as an input value becomes a predetermined value FV, and applying the tone curve to the luminance value or the R, G, and B values of each pixel of the image (see JP-A-2004-341889).

The backlight correction of the related art has the following problems.

As described above, the tone curve for backlight correction is determined on the basis of the relationship between the luminance average value of the flesh color pixels substantially corresponding to the human image and a prescribed ideal value (predetermined value FV). For this reason, if the input image is corrected by the tone curve, the brightness of the human image which was intrinsically dark appropriately increases to some extent. However, the tone curve is determined without taking the state of the intrinsically bright portion in the backlight image into consideration. Accordingly, if the tone curve is applied, the bright portion (for example, the background of the human image or the like) is excessively corrected. Excessive correction may put the bright portion in a stark white state (whiteout state). That is, the backlight correction of the related art may cause whiteout of the bright portion in the backlight image.

Even if backlight correction is performed for the input image, the color balance in the input image may be broken. That is, in obtaining a high-quality image, it is necessary to appropriately perform a plurality of kinds of correction including backlight correction while taking the mutual influence of correction into consideration.

SUMMARY OF THE INVENTION

An advantage of some aspects of at least one embodiment of the invention is that it provides an image processing apparatus, an image processing method, an image processing program, and a printing apparatus capable of producing an appropriate correction effect for a dark portion in a backlight image while keeping the colors of a bright portion and adjusting the color balance of the entire image, thereby obtaining a high-quality image as a whole.

According to an aspect of the invention, an image processing apparatus includes a specific image detection unit detecting an area including at least a part of a specific image in an input image, a representative color calculation unit calculating a representative color of the specific image on the basis of pixels belonging to the area detected by the specific image detection unit, a first correction curve acquisition unit acquiring a first correction curve for gradation correction on the basis of brightness of the representative color, a second correction curve acquisition unit correcting the representative color by the first correction curve and acquiring a second correction curve for gradation correction for every element color on the basis of the gradation value for every element color constituting the representative color after correction, a first correction unit correcting the gradation values of pixels, which belong to a color gamut defining a dark portion, from among pixels constituting the input image by using the first correction curve, and a second correction unit correcting the gradation value for every element color in each pixel constituting the input image by using the second correction curve.

According to this aspect of at least one embodiment of the invention, the dark portion of the input image is corrected by the first correction curve, which is acquired on the basis of brightness of the representative color, and each element color of the input image is corrected by the second correction curve for every element color, in which a degree of correction is determined in accordance with each element color constituting the representative color after correction by the first correction curve. Therefore, when the input image is a backlight image or the like, the brightness of an intrinsically dark portion appropriately increases, and a balance between the element colors of the image is adjusted. As a result, a high-quality image is obtained. Specifically, for all the pixels of the input image including pixels corrected by the first correction unit, the second correction unit may correct the gradation value for every element color in each pixel by using the second correction curve. That is, the second correction curve is applied to the entire image after the dark portion of the input image is subjected to correction by the first correction curve and the brightness of the dark portion is corrected. As a result, backlight correction and balance correction between the element colors in the entire image can be appropriately realized.

The image processing apparatus may further include a preliminary correction unit calculating the maximum value for every element color in the input image before correction by the first correction unit and the second correction unit, and correcting each element color in the input image before correction by the first correction unit and the second correction unit so as to suppress a variation in the maximum value. With this configuration, before correction by the first correction unit and the second correction unit, the white balance of the input image is adjusted. For this reason, an image with a broken white balance is prevented from being output as the result of correction by the first correction unit or the like.

The second correction curve acquisition unit may calculate a difference between the gradation value for every element color constituting the representative color after correction and a predetermined reference value, and may generate the second correction curve for every element color in accordance with the calculated difference for every element color. With this configuration, the optimum second correction curve for correction of a shift between the element colors of the input image after correction by the first correction curve can be obtained.

The first correction curve acquisition unit may shift a part of a curve in a low gradation area upward on the basis of a difference between brightness of the representative color and brightness of a background area in the input image to generate the first correction curve which is curved convex upward in the low gradation area, approaches a line with the same input gradation value and output gradation value in an intermediate gradation area, and converges on the line from the intermediate gradation area to a high gradation area. With this configuration, the first correction curve can be obtained in which a range from the low gradation area to the intermediate gradation area is partially convex upward with respect to the line, in which the input gradation value and the output gradation value are equal to each other over the entire gradation area. If such a first correction curve is used, only the dark portion of the image can be accurately corrected.

The first correction curve acquisition unit may increase the degree of shift of the curve as the difference between brightness of the representative color and brightness of the background area is larger. With this configuration, basically, as the difference in brightness between the area on the specific image and the background area is larger, the degree of correction for the dark portion increases.

The first correction curve acquisition unit may increase the degree of shift of the curve as brightness of the representative color is lower. With this configuration, basically, as the area on the specific image is darker, the degree of correction for the dark portion increases.

The first correction unit may acquire a luminance distribution of the input image, specify a gradation value corresponding to a trough in the luminance distribution, specify a position on a gray axis of a predetermined calorimetric system corresponding to the specified gradation value, and define a color gamut in the calorimetric system where an upper limit value in a gray axis direction is at the specified position on the gray axis. When the input image is a backlight image, the luminance distribution of the input image is likely to concentrate on the low gradation side and the high gradation side, and a trough of the distribution is likely to occur between the low gradation side and the high gradation side. With the above-described configuration, the upper limit position in the gray axis direction of the color gamut defining the dark portion is determined in accordance with the gradation value of the trough. For this reason, for the pixels that are concentratively distributed on the low gradation side in the luminance distribution, correction by the first correction curve can be performed.

The first correction unit may specify a gradation value corresponding to a trough in the luminance distribution on a low gradation side lower than a predetermined gradation value within a predetermined input gradation range with a low change rate of the output gradation value by the first correction curve. In the first correction curve, a range in which the change rate of the output gradation value is slower than the change rate of the input gradation value may occur near the intermediate gradation area due to the shape characteristic of the first correction curve, and for the pixels belonging to such a gradation area, in terms of maintenance of the gradation property, it should suffice that the first correction curve is not applied, if possible. With the above-described configuration, even if a plurality of troughs exist in the luminance distribution, the upper limit in the gray axis direction of the color gamut is determined in accordance with the gradation value of the trough on the low gradation side lower than the predetermined gradation value within the input gradation range with the low change rate of the output gradation value in the first correction curve. For this reason, correction of the dark portion can be performed without damaging the gradation property of the image.

The first correction unit may change the degree of correction for the pixels in accordance with a distance between a center axis in the gray axis direction of the color gamut and a pixel subject to correction. With this configuration, for pixels further away from the center axis of the color gamut from among the pixels belonging to the color gamut defining the dark portion, the degree of correction by the first correction unit is weakened. Therefore, the gradation property in the input image after correction can be appropriately maintained.

The representative color calculation unit may calculate, as the representative color, a color formed by the average value for every element color in the pixels, which belong to the area detected by the specific image detection unit and belong to a color gamut in a predetermined calorimetric system as a color gamut corresponding to the specific image. With this configuration, the representative color in which the color of the specific image is accurately reflected can be obtained, and thus in acquisition of the first correction curve or the second correction curve on the basis of such a representative color, a more appropriate correction curve can be obtained.

The specific image detection unit may detect an area including at least a part of a face image in the input image. With this configuration, the dark portion of the input image can be corrected and the balance between the element colors of the input image can be adjusted on the basis of the brightness of the face image, which is an important subject in the input image. For this reason, for a backlight image in which a face is caught dark, an optimum correction result can be obtained.

In addition to the above-described image processing apparatus, the technical idea of at least one embodiment of the invention may be applied to an image processing method that includes processing steps executed by the units of the image processing apparatus, and an image processing program that causes a computer to execute functions corresponding to the units of the image processing apparatus. The image processing apparatus, the image processing method, and the image processing program may be implemented by hardware, such as a PC or a server, and it may also be implemented by various products, such as a digital still camera or a scanner as an image input apparatus, a printer (printing apparatus), a projector, or a photo viewer as an image output apparatus, and the like.

BRIEF DESCRIPTION OF THE DRAWINGS

The invention will be described with reference to the accompanying drawings, wherein like numbers reference like elements.

DETAILED DESCRIPTION OF AN EXEMPLARY EMBODIMENT

Figure 1:
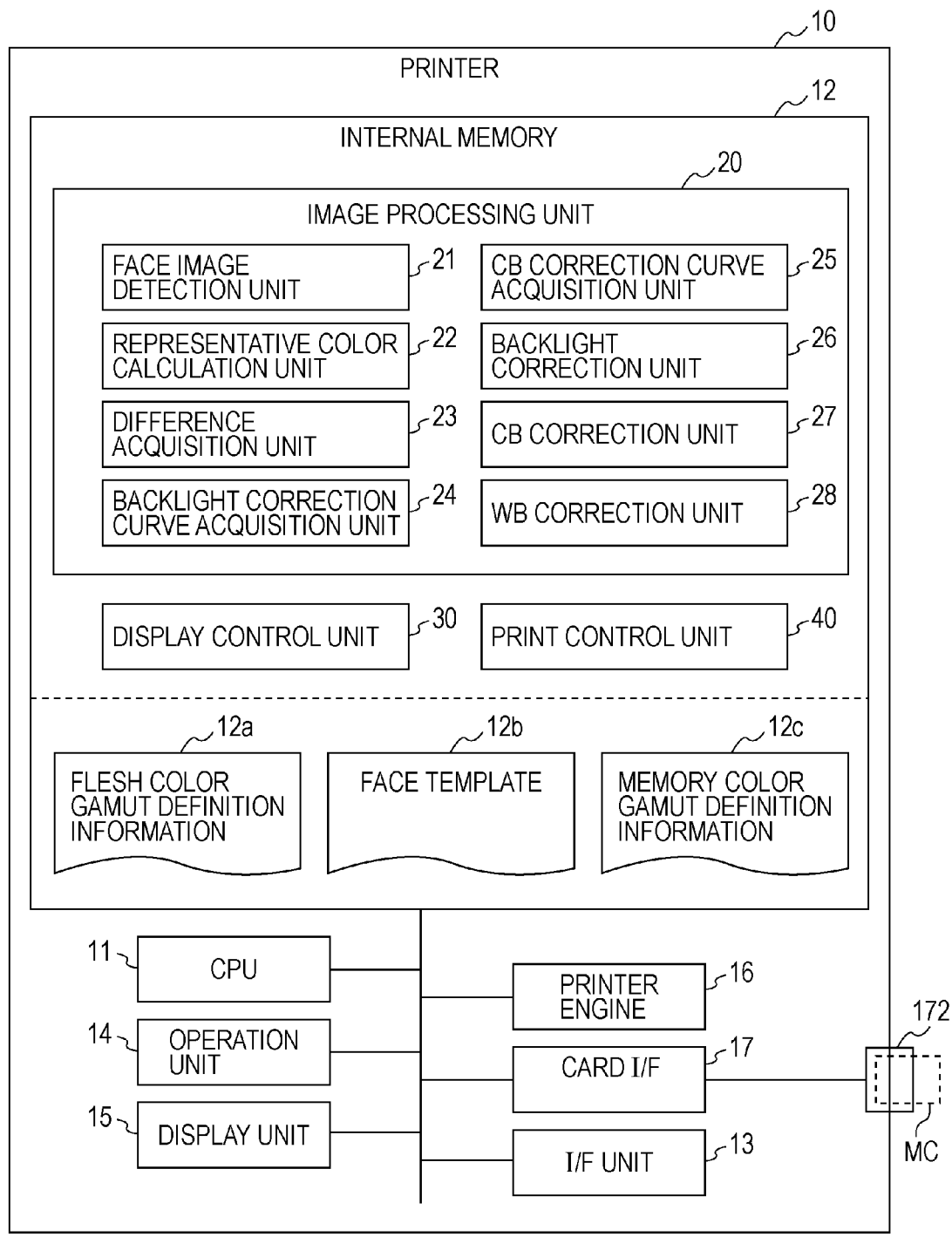
FIG. 1 is a block diagram showing the schematic configuration of a printer.

An embodiment of the invention will be described in the following sequence.
1. Schematic Configuration of Printer
2. Skin Representative Color Calculation
3. Correction Curve Generation
4. Correction Processing
5. Modification
6. Summary
1. Schematic Configuration of Printer FIG. 1 schematically shows the configuration of a printer 10 which is an example of an image processing apparatus or a printing apparatus of the invention. The printer 10 is a color printer (for example, a color ink jet printer) that prints an image on the basis of image data acquired from a recording medium (for example, a memory card MC or the like), that is, addresses so-called direct print. The printer 10 includes a CPU 11 controlling the individual units of the printer 10, an internal memory 12 formed by, for example, a ROM or a RAM, an operation unit 14 formed by buttons or a touch panel, a display unit 15 formed by a liquid crystal display, a printer engine 16, a card interface (card I/F) 17, and an I/F unit 13 for exchange of information with various external apparatuses, such as a PC, a server, a digital still camera, and the like. The constituent elements of the printer 10 are connected to each other through a bus.

The printer engine 16 is a print mechanism for printing on the basis of print data. The card I/F 17 is an I/F for exchange of data with a memory card MC inserted into a card slot 172. The memory card MC stores image data, and the printer 10 can acquire image data stored in the memory card MC through the card I/F 17. As the recording medium for provision of image data, various mediums other than the memory card MC may be used. Of course, the printer 10 may acquire image data from the external apparatus, which is connected thereto through the I/F unit 13, other than the recording medium. The printer 10 may be a consumer-oriented printing apparatus or a DPE-oriented printing apparatus for business use (so-called mini-lab machine). The printer 10 may acquire print data from the or the server, which is connected thereto through the I/F unit 13.

The internal memory 12 stores an image processing unit 20, a display control unit 30, and a print control unit 40. The image processing unit 20 is a computer program that executes various kinds of image processing, such as correction processing and the like, for image data under a predetermined operating system. The display control unit 30 is a display driver that controls the display unit 15 to display a predetermined user interface (UI) image, a message, or a thumbnail image on the screen of the display unit 15. The print control unit 40 is a computer program that generates print data defining the amount of a recording material (ink or toner) to be recorded in each pixel on the basis of image data, which is subjected to correction processing or the like by the image processing unit 20, and controls the printer engine 16 to print an image onto a print medium on the basis of print data.

The CPU 11 reads out each program from the internal memory 12 and executes the program to implement the function of each unit. The image processing unit 20 includes, as a program module, at least a face image detection unit 21, a representative color calculation unit 22, a difference acquisition unit 23, a backlight correction curve acquisition unit 24, a color balance (CB) correction curve acquisition unit 25, a backlight correction unit 26, a CB correction unit 27, and a white balance (WB) correction unit 28. The face image detection unit 21 corresponds to a specific image detection unit, the backlight correction curve acquisition unit 24 corresponds to a first correction curve acquisition unit or a correction curve acquisition unit, and the CB correction curve acquisition unit 25 corresponds to a second correction curve acquisition unit. The backlight correction unit 26 corresponds to a first correction unit or a correction unit, the CB correction unit 27 corresponds to a second correction unit, and the WB correction unit 28 corresponds to a preliminary correction unit. The functions of these units will be described below. The internal memory 12 also stores flesh color gamut definition information 12a, face template 12b, memory color gamut definition information 12c, and various kinds of data or programs, starting with individual functions. The printer 10 may be a so-called multi-function device including various functions, such as a copy function or a scanner function (image reading function), in addition to a print function.

Next, a processing that is executed by the image processing unit 20 in the printer 10 will be described.
2. Skin Representative Color Calculation FIG. 2 is a flowchart showing a processing that is executed by the image processing unit 20.

In this embodiment, the processing that is executed by the image processing unit 20 includes at least backlight correction, color balance correction, and a processing to generate a correction curve for backlight correction or color balance correction. As the premise for correction curve generation, the image processing unit 20 obtains a skin representative color in an input image. The skin representative color means a color representing a face image in the input image, and more specifically, means a color representing a color of a skin portion of the face image.

In Step S100 (hereinafter, "Step" will be omitted), the image processing unit 20 acquires image data D representing an image to be processed from a recording medium, such as the memory card MC or the like. That is, when a user operates the operation unit 14 in reference to a UI image displayed on the display unit 15 and assigns image data D to be processed, the image processing unit 20 reads assigned image data D. The image processing unit 20 may acquire image data D from the PC, the server, or the digital still camera through the I/F unit 13. Image data D is bitmap data in which the color of each pixel is expressed by gradations (for example, 256 gradations from 0 to 255) for every element color (RGB). Image data D may be compressed when being recorded in the recording medium, or the color of each pixel may be expressed by a different calorimetric system. In these cases, development of image data D or conversion of the calorimetric system is executed, and the image processing unit 20 acquires image data D as RGB bitmap data. The so-acquired image data D corresponds to an input image.

Figure 2:
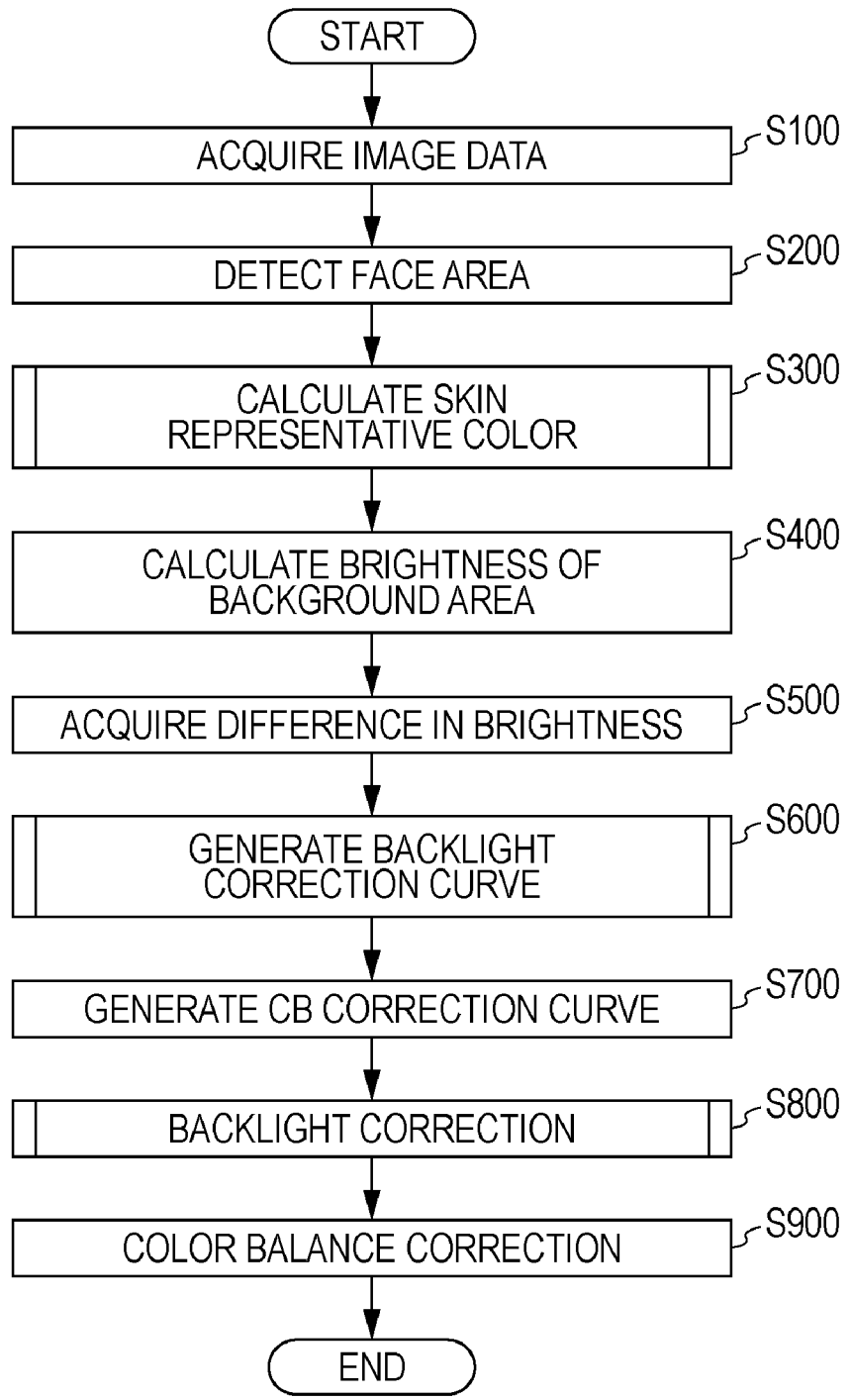
FIG. 2 is a flowchart showing a processing that is executed by an image processing unit.

The processing shown in FIG. 2 is a correction processing that is particularly useful for a backlight image. For this reason, in this embodiment, a description will be provided on the premise that image data D acquired in S100 represents a backlight image which includes a face image within an image area (in particular, an image in which a portion of a face image is dark).

In S200, the face image detection unit 21 detects a face area from image data D. The face area means an area that includes at least a part of the face image (a kind of a specific image). With respect to the face image detection unit 21, any method may be used insofar as the face area can be detected. For example, the face image detection unit 21 detects the face area from image data D by so-called pattern matching using a plurality of templates (the face template 12b). In the pattern matching, a rectangular detection area SA is set on image data D, and similarity between an image within the detection area SA and an image of each face template 12b is evaluated while changing the position and size of the detection area SA on image data D. A detection area SA that has similarity satisfying a predetermined reference is detected as a face area. The face area may be detected for a single face or multiple faces in image data D by moving the detection area SA over the entire image data D. In this embodiment, a description will be provided for an example where a single face area including a single face is detected. The face image detection unit 21 may detect a face area by using a preliminarily learned neural network which receives various kinds of information of an image (for example, luminance information, edge amount, contrast, or the like) in the unit of the detection area SA and outputs information on whether or not a face image is present in the detection area SA, or may determine, by using a support vector machine, whether or not a face area is present in each detection area SA.

Figure 3:
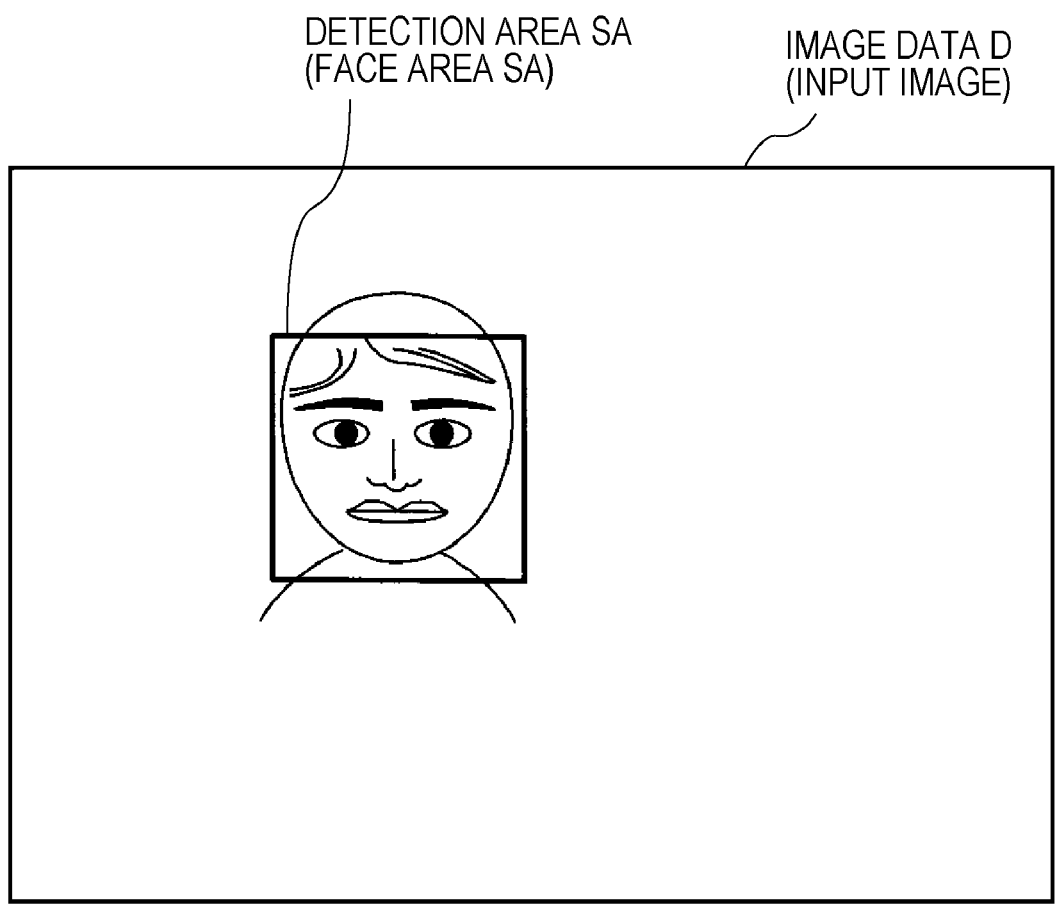
FIG. 3 is a diagram showing a face area detected in image data.

FIG. 3 shows a rectangular detection area SA detected from image data D as a face area in S200. Hereinafter, in S200, the detection area SA detected as the face area is called a face area SA.

In S300, the representative color calculation unit 22 calculates a skin representative color on the basis of pixels within the face area SA.

Figure 4:
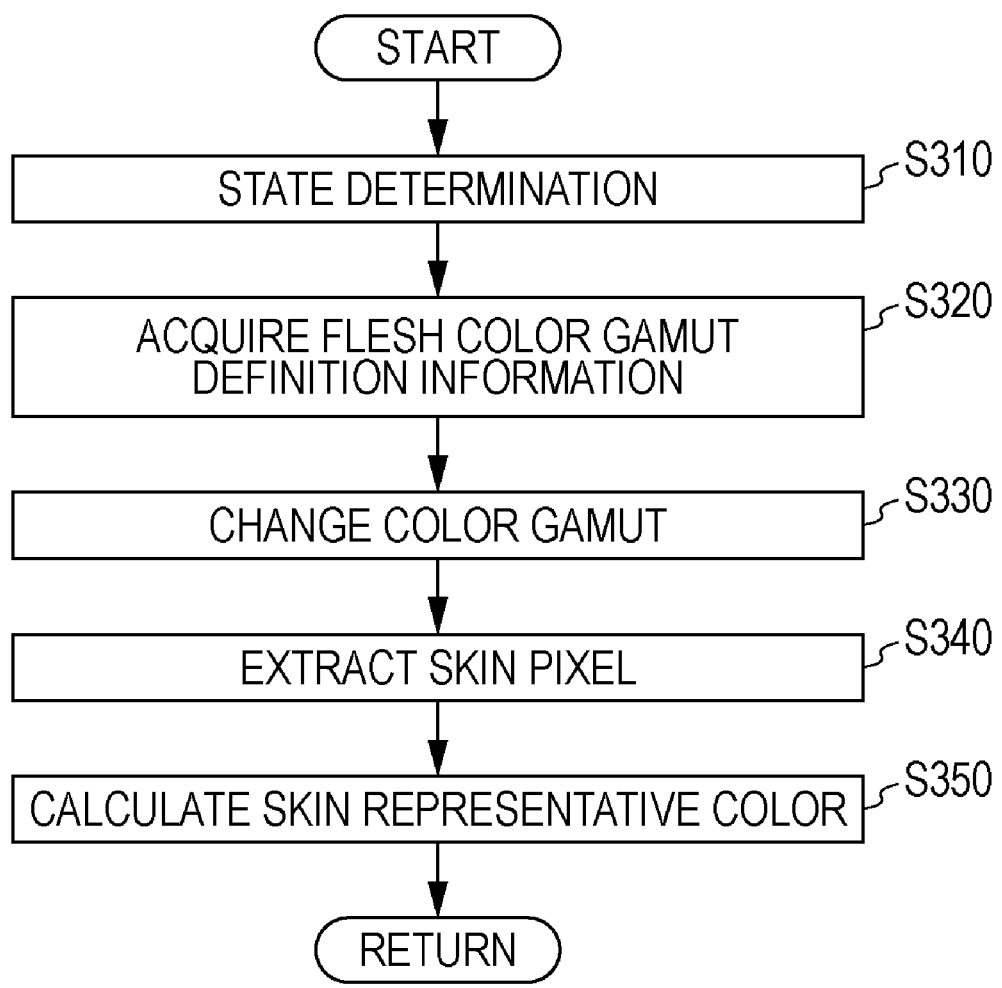
FIG. 4 is a flowchart showing the details of a skin representative color calculation processing.

FIG. 4 is a flowchart showing the details of the processing in S300.

In S310, the representative color calculation unit 22 determines the state of image data D. The state of image data D means a state that is decided on the basis of brightness in the image of image data D or the feature of a subject in the image. In this embodiment, in S310, it is determined whether or not the image of image data D is a backlight image. A method of determining whether or not the image of image data D is a backlight image is not particularly limited. For example, the representative color calculation unit 22 samples pixels with a predetermined extraction ratio for the entire range of image data D and generates a luminance distribution of the sampled pixels. In general, the luminance distribution of the backlight image tends to concentrate on a high gradation side and a low gradation side, and a trough of the distribution tends to occur in an intermediate gradation area. For this reason, the representative color calculation unit 22 can determine, in accordance with the shape characteristic of the generated luminance distribution whether or not the image of image data D is a backlight image.

Alternatively, in sampling the pixels from image data D, the representative color calculation unit 22 samples the pixels with an extraction ratio higher in a near-center area of the image than in a peripheral area of the near-center area, and calculates the average value of luminance (luminance average value) of the sampled pixels. The representative color calculation unit 22 may compare the so-calculated luminance average value centering on the area at the center of the image with a preliminarily prepared threshold value, and when the luminance average value is equal to or less than the threshold value, may determine that image data D is an image, the near-center area of which is dark, that is, a backlight image. As described above, since image data D acquired in S100 is a backlight image, in S310, the representative color calculation unit 22 determines that image data D is a backlight image.

In S320, the representative color calculation unit 22 reads out the flesh color gamut definition information 12a from the internal memory 12. The flesh color gamut definition information 12a is information with a preliminarily defined standard range (flesh color gamut) of a color (flesh color) in a predetermined calorimetric system, to which the image (face image) detected by the face image detection unit 21 corresponds. In this embodiment, for example, the flesh color gamut definition information 12a defines a flesh color gamut in an L*a*b* calorimetric system (hereinafter, "*" is omitted) defined by the CIE (International Commission on Illumination). With respect to the definition of the flesh color gamut by the flesh color gamut definition information 12a, various calorimetric systems, such as an HSV calorimetric system, an XYZ calorimetric system, a RGB calorimetric system, and the like, may be used. It should suffice that the flesh color gamut definition information 12a is information that defines a flesh-like color gamut in a calorimetric system.

Figure 5:
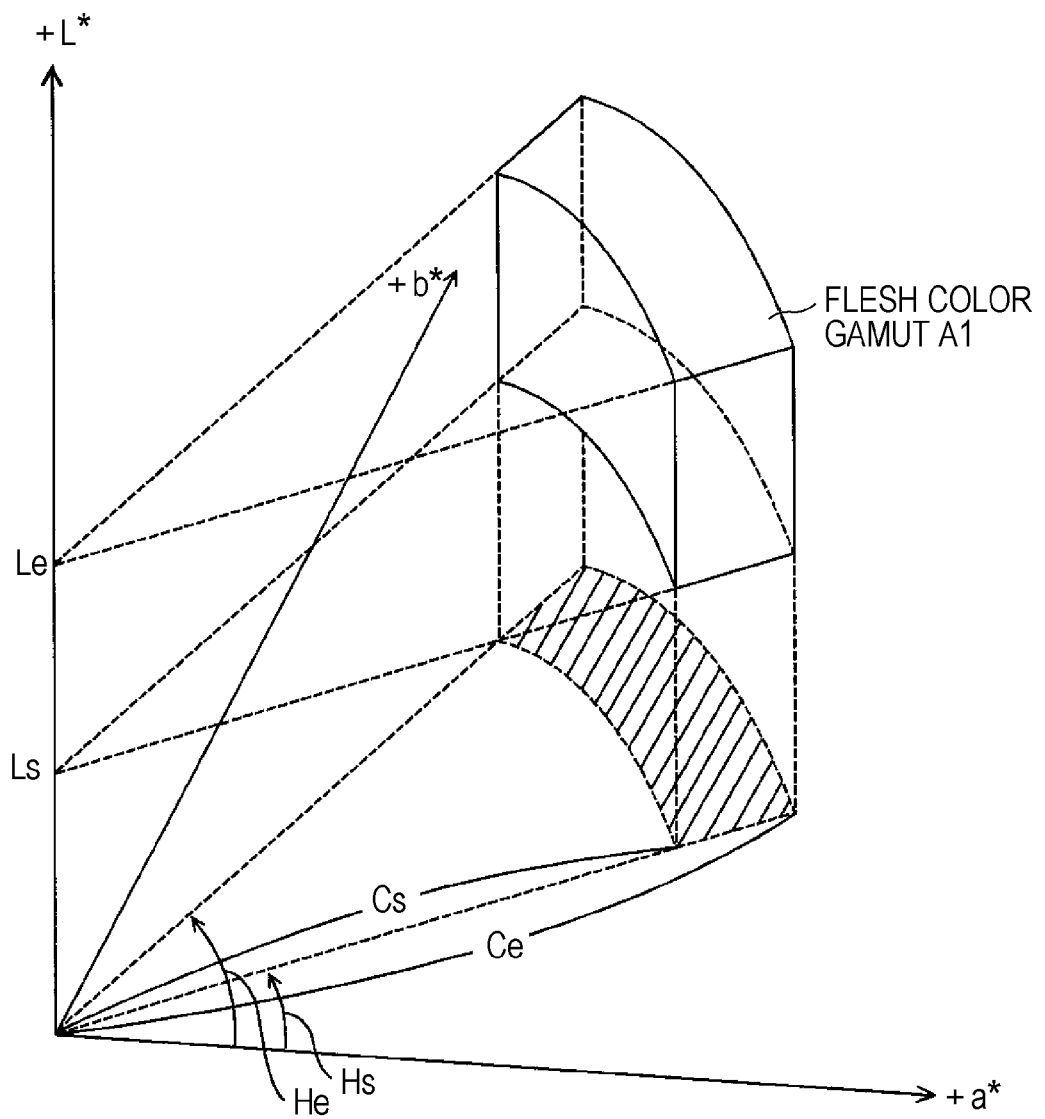
FIG. 5 is a diagram showing a flesh color gamut that is defined by flesh color gamut definition information.

FIG. 5 shows an example of a flesh color gamut A1 that is defined by the flesh color gamut definition information 12a in the Lab calorimetric system. The flesh color gamut definition information 12a defines the flesh color gamut A1 by the ranges of lightness L, chroma C, and hue H, Ls≦L≦Le, Cs≦C≦Ce, and Hs≦H≦He. In the example of FIG. 5, the flesh color gamut A1 is a solid having six faces. FIG. 5 also shows a projection view of the flesh color gamut A1 onto the ab plane by hatching. Meanwhile, the flesh color gamut that is defined by the flesh color gamut definition information 12a does not need to be a six-faced solid. For example, the flesh color gamut may be a spherical area that is defined by a single coordinate in the Lab calorimetric system representing the center point of the flesh color gamut and a radius r around the single coordinate, or other shapes may be used.

In S330, the representative color calculation unit 22 changes the flesh color gamut A1 in accordance with the determination result in S320. Specifically, in S320, if it is determined that image data D is a backlight image, the flesh color gamut A1 is changed to include a color gamut on a low chroma side, as compared with at least the flesh color gamut before being changed.

Figure 6:
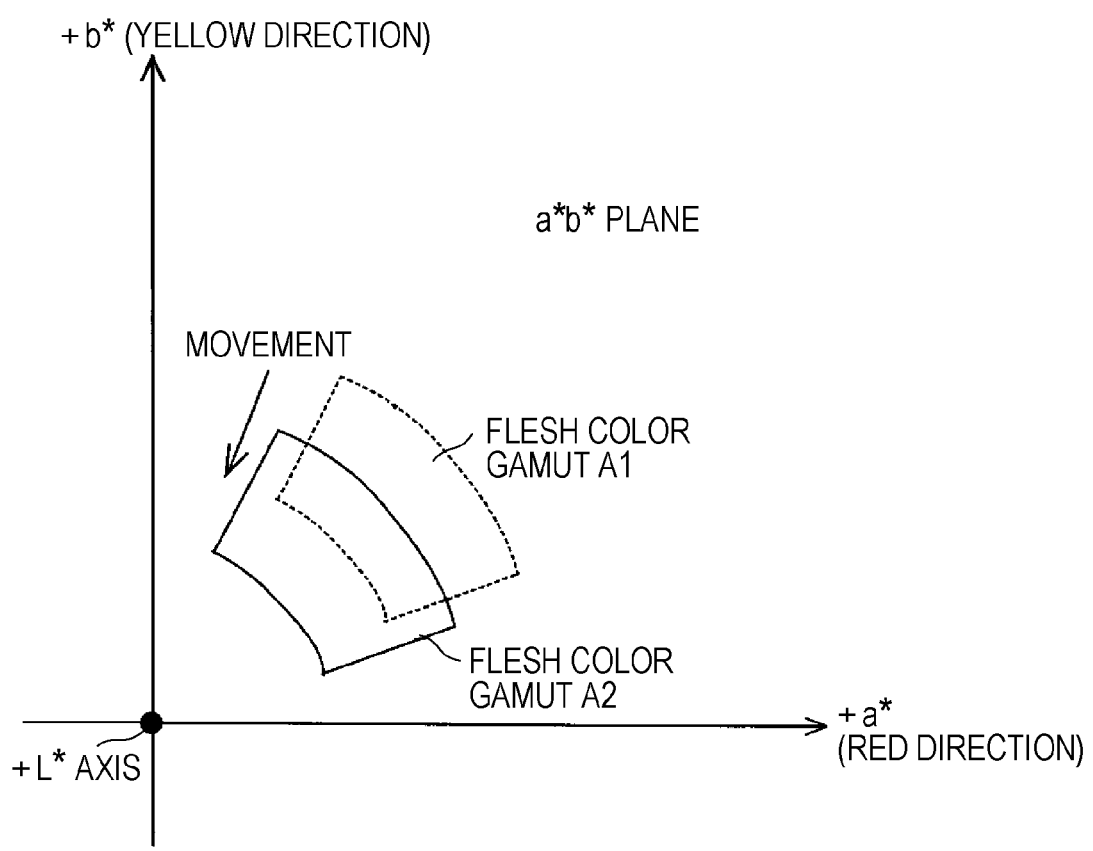
FIG. 6 is a diagram showing an example of a change of a flesh color gamut.

FIG. 6 shows an example of change of a color gamut that, when image data D is determined to be a backlight image, is executed by the representative color calculation unit 22. In FIG. 6, the flesh color gamut A1 before change (chain line) and a flesh color gamut A2 after change (solid line) are shown on the ab plane in the Lab calorimetric system. When image data D is a backlight image, the representative color calculation unit 22 moves the flesh color gamut A1 so as to approach the chroma range of the flesh color gamut A1 to the L axis (gray axis), and sets a color gamut after movement as the flesh color gamut A2. That is, since image data D is a backlight image, the color of the skin portion of the face image strongly tends to have low chroma. For this reason, a shift between the color of each pixel of the skin portion and the standard flesh color gamut, which is intrinsically defined by the flesh color gamut definition information 12a is corrected. Let the chroma range after movement be Cs'≦C≦Ce', then, the flesh color gamut A2 is defined by the ranges of lightness L, chroma C, and hue H, Ls≦L≦Le, Cs'≦C≦Ce', and Hs≦H≦He. Meanwhile, only if the chroma range of the flesh color gamut is moved to the low chroma side, the flesh color gamut A2 after movement may become small, as compared with the flesh color gamut A1 before movement. Accordingly, as shown in FIG. 6, the hue range may be widened, along with the change of the chroma range.

Alternatively, when image data D is determined to be a backlight image, the representative color calculation unit 22 may deform (expand) the flesh color gamut A1 to the L axis side so as to get a lower limit (Cs) of the chroma range of the flesh color gamut A1 close to the L axis, and may set an area after expansion as the flesh color gamut A2. Let the chroma range after expansion be Cs'≦C≦Ce, then, the flesh color gamut A2 is defined by the ranges Ls≦L≦Le, Cs'≦C≦Ce, and Hs≦H≦He. In addition, when image data D is a backlight image, the representative color calculation unit 22 may acquire the flesh color gamut A2 after change by moving the flesh color gamut A1 while expanding the chroma range of the flesh color gamut A1, or may change the lightness range of the flesh color gamut A1. The color gamut A2 after change corresponds to a color gamut in a predetermined calorimetric system as a color gamut corresponding to a specific image.

In S340, the representative color calculation unit 22 extracts pixels, the color of which belongs to the flesh color gamut A2 after change, from among the pixels belonging to the face area SA. In this case, the representative color calculation unit 22 converts RGB data of each pixel in the face area SA into data (Lab data) of the calorimetric system (Lab calorimetric system) used by the flesh color gamut A2, and determines whether or not Lab data after conversion belongs to the flesh color gamut A2. The representative color calculation unit 22 extracts only pixels, Lab data of which belongs to the flesh color gamut A2, as skin pixels. The representative color calculation unit 22 can convert RGB data into Lab data by using a predetermined color conversion profile for conversion from the RGB calorimetric system into the Lab calorimetric system. The internal memory 12 may store such a color conversion profile. In this embodiment, a case where a singe face area SA is detected from image data D is described. However, when a plurality of face areas SA are detected from the image data D, in S340, the representative color calculation unit 22 determines whether or not each pixel in a plurality of face areas SA belongs to the flesh color gamut A2, and extracts pixels belonging to the flesh color gamut A2 as skin pixels.

In S350, the representative color calculation unit 22 calculates the skin representative color on the basis of a plurality of skin pixels extracted in S340. The skin representative color may be calculated in various ways, and in this embodiment, the representative color calculation unit 22 calculates the average values Rave, Gave, and Bave of RGB in each skin pixel, and sets a color (RGB data) formed by the average values Rave, Gave, and Bave as the skin representative color. The representative color calculation unit 22 stores RGB data of the skin representative color in a predetermined memory area of the internal memory 12 or the like. In this way, when extracting the skin pixels for calculation of the skin representative color from the face area SA, the representative color calculation unit 22 extracts, as the skin pixels, not only the pixels by using the flesh color gamut represented by the flesh color gamut definition information 12a, and after the flesh color gamut represented by the flesh color gamut definition information 12a is changed in accordance with the state of image data D (backlight image), but the pixels belonging to the flesh color gamut after change. As a result, even if the color of the face image in the input image is not a standard flesh color, the pixels corresponding to the skin portion of the face image can be reliably extracted, and an accurate skin representative color of each input image can be obtained. In the above description, although when the input image is a backlight image, the representative color calculation unit 22 is configured to change the flesh color gamut, even when the input image is, for example, an image in a so-called color seepage state, an exposure-shortage under image (overall dark image), or an exposure-excess over image (overall bright image), the flesh color gamut defined by the flesh color gamut definition information 12a may be changed in accordance with the determination result.

In S400, the difference acquisition unit 23 acquires brightness of the background area in image data D. The difference acquisition unit 23 divides the image area in image data D into a plurality of areas. For example, the difference acquisition unit 23 sets an area not including the face area SA in a frame-shaped area, which is defined by four sides of the image represented by image data D as a peripheral area, and sets an area other than the peripheral area as a central area. In general, in a backlight image, the central area where a main subject, such as a face or the like, is disposed is dark, and the peripheral area is brighter than the central area.

Figure 7:
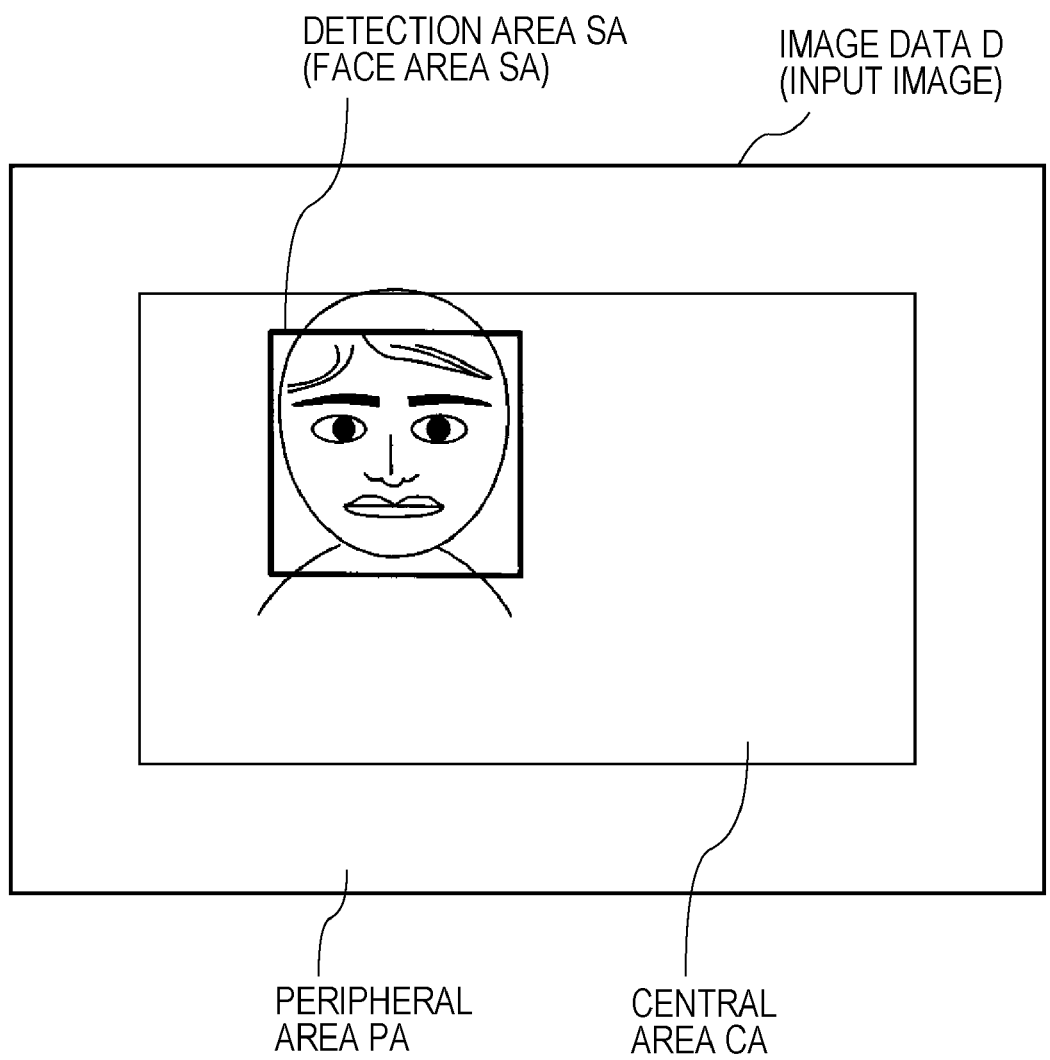
FIG. 7 is a diagram showing an example where an area of image data is divided into a central area and a peripheral area.

FIG. 7 shows an example where the difference acquisition unit 23 divides the image area of image data D into a central area CA and a peripheral area PA. As described above, when the representative color calculation unit 22 determines whether or not image data D is a backlight image (S310), as shown in FIG. 7, image data D may be divided into the central area CA and the peripheral area PA, and more pixels may be sampled from the central area CA.

For example, in S400, the difference acquisition unit 23 samples pixels from the peripheral area PA with a predetermined extraction ratio. Then, the luminance average value of each pixel sampled from the peripheral area PA is calculated, and the luminance average value is set as the brightness of the background area. That is, in this case, the peripheral area PA is a background area. The luminance of each pixel may be obtained by giving a predetermined weighted value to each of the gradations of RGB of the pixel and adding RGB, and then the obtained luminance of each pixel may be averaged to obtain the luminance average value.

Alternatively, in S400, the difference acquisition unit 23 may sample pixels with an extraction ratio in the peripheral area PA than in the central area CA for the entire area of image data D, calculate the luminance average value for the sampled pixels, and set the luminance average value as the brightness of the background area. That is, the difference acquisition unit 23 gives a weighted value to the peripheral area PA rather than the central area CA so as to obtain the luminance average value.

In S400, the difference acquisition unit 23 may extract only pixels corresponding to a predetermined memory color from among the pixels belonging to the background area (for example, the peripheral area PA). Then, the luminance average value of each pixel corresponding to the memory color may be calculated, and the luminance average value may be set as the brightness of the background area.

As the memory color, for example, blue corresponding to the color of sky, green corresponding to the color of a mountain or forest, and the like may be used. The printer 10 preliminarily stores the memory color gamut definition information 12c, which defines the color gamut of each memory color in a predetermined calorimetric system (for example, the Lab calorimetric system), in the internal memory 12, similarly to the flesh color gamut definition information 12a. In S400, the difference acquisition unit 23 extracts pixels, the color of which belongs to the color gamut defined by the memory color gamut definition information 12c, from among the pixels belonging to the background area, and calculates the luminance average value of each extracted pixel. If the luminance average value of the background area is calculated only on the basis of the pixels corresponding to the memory colors from among the pixels belonging to the background area, the luminance average value that accurately represents the brightness of an actual background portion (sky or mountain) in the image represented by image data D can be obtained. Although a plurality of memory colors, such as blue, green, and the like, are defined, the difference acquisition unit 23 may calculate the luminance average value by using pixels corresponding to any memory colors, or may calculate the luminance average value by using only pixels corresponding to some memory colors. For example, when the number of pixels corresponding to the memory color "green" from among the pixels belonging to the background area is smaller than a predetermined number, and the number of pixels corresponding to the memory color "blue" is equal to or larger than the predetermined number, the luminance average value may be calculated on the basis of a larger number of pixels corresponding to the memory color "blue".

As described above, the difference acquisition unit 23 calculates the brightness (luminance average value) of the background area by one of the above-described methods. In the following description, for convenience, the luminance average value calculated by the difference acquisition unit 23 in S400 is represented by luminance Yb.

In S500, the difference acquisition unit 23 acquires a difference between the brightness of the face area SA and the brightness of the background area. In this case, the difference acquisition unit 23 calculates luminance from RGB of the skin representative color calculated in S300 by the above-described weighted addition method. In the following description, the luminance calculated from RGB of the skin representative color is represented by luminance Yf. It can be said that the luminance Yf is the brightness of the skin representative color, and substantially represents the luminance average value of each skin pixel. It can also be said that the luminance Yf represents the brightness of the face area SA. Then, the difference acquisition unit 23 calculates a luminance difference Yd (the luminance Yb−the luminance Yf) between the luminance Yb calculated in S400 and the luminance Yf, and acquires the luminance difference Yd as the difference between the brightness of the face area SA and the brightness of the background area. When the luminance Yb>the luminance Yf, the luminance difference Yd is positive. In this embodiment, it is assumed that the luminance Yb>the luminance Yf.

3. Correction Curve Generation

As described above, after the skin representative color, the luminance Yf, and the luminance difference Yd in the input image are obtained, in S600, the backlight correction curve acquisition unit 24 generates a backlight correction curve (corresponding to a first correction curve or a correction curve) for backlight correction. In S700, the CB correction curve acquisition unit 25 generates a CB correction curve (corresponding to a second correction curve) for color balance correction.

Figure 8:
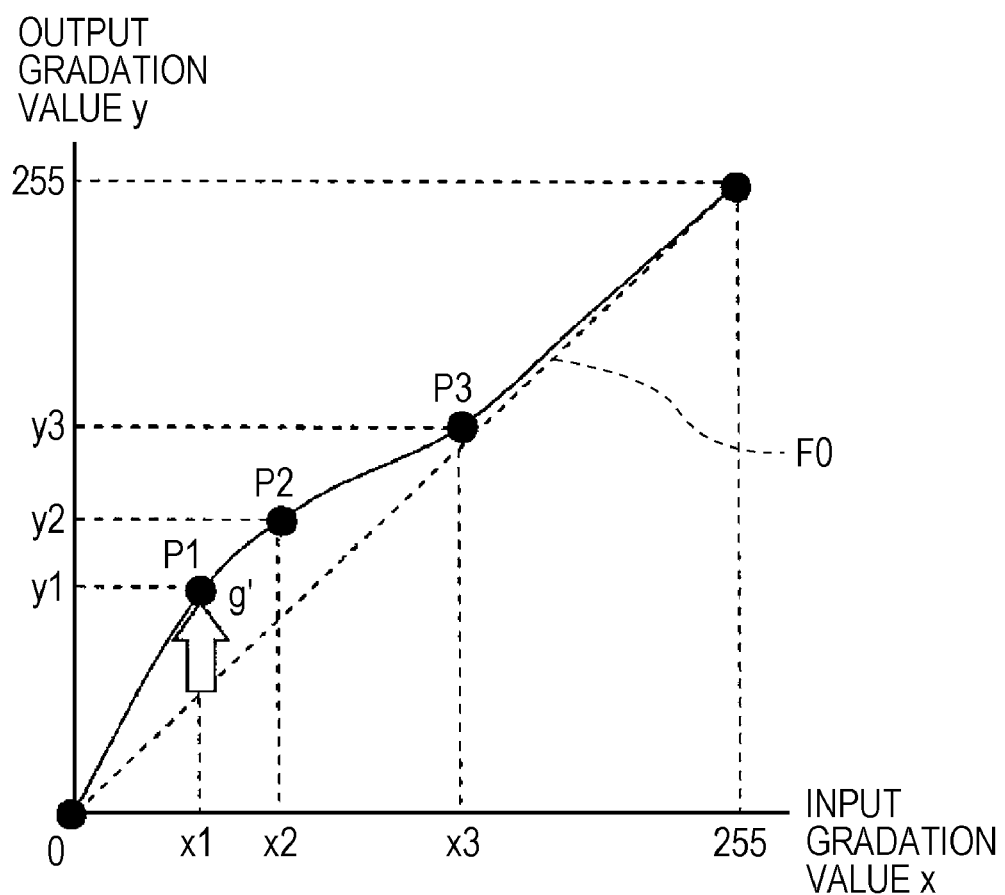
FIG. 8 is a diagram showing a backlight correction curve.

FIG. 8 shows an example of a backlight correction curve F1 that is generated by the backlight correction curve acquisition unit 24.

The backlight correction curve F1 is a gradation conversion characteristic that is defined on a two-dimensional coordinate (xy plane) with the horizontal axis of an input gradation values x (0 to 255) and the vertical axis of an output gradation value y (0 to 255). Specifically, as shown in FIG. 8, the backlight correction curve F1 has a shape that is curved convex upward in a low gradation area, gradually approaches a line F0, in which the input gradation value x and the output gradation value y are equal to each other, in an intermediate gradation area, and converges on the line F0 from the intermediate gradation area to the high gradation area. The backlight correction curve acquisition unit 24 generates the backlight correction curve F1 having such a shape on the basis of the brightness (luminance Yf) of the skin representative color or the luminance difference Yd.

Figure 9:
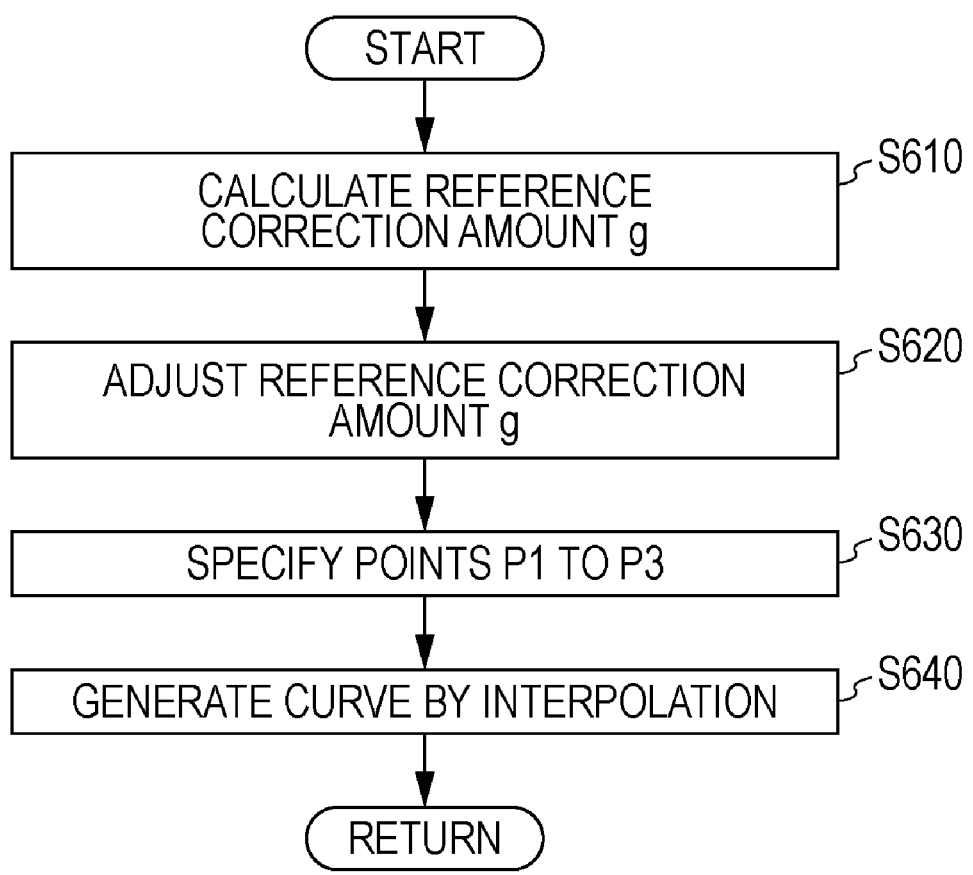
FIG. 9 is a flowchart showing the details of a backlight correction curve generation processing.

FIG. 9 is a flowchart showing the details of the processing in S600.

In S610, the backlight correction curve acquisition unit 24 obtains a reference correction amount g in backlight correction on the basis of the luminance Yf. The lower the luminance Yf, the larger the reference correction amount g, and the higher the luminance Yf, the smaller the reference correction amount g. The backlight correction curve acquisition unit 24 defines a function $f_1(Y)$ for obtaining the reference correction amount g. That is, the relationship $g=f_1(Y)$ is established. The function $f_1(Y)$ is a function that forms the gradation interval $0 \leq y \leq Y1$ of the luminance Y by a quadratic curve and forms the gradation interval $Y1 \leq Y \leq Y2$ by a line. The function $f_1(Y)$ is expressed as follows.

$$0 \leq y \leq Y1, f_1(Y) = gmax - \alpha1 \cdot Y^2 \quad (1)$$

$$Y1 \leq Y \leq Y2, f_1(Y) = \beta1 \cdot (Y2 - Y) \quad (2)$$

$$Y2 \leq Y, f_1(Y) = 0 \quad (3)$$

The values gmax, Y1, and Y2 are derived through a preliminary test or the like, and in this embodiment, gmax=50, Y1=64, and Y2=128. When Y=Y1, the quadratic curve $f_1(Y1)$ of Equation (1) is identical to the line $f_1(Y1)$ of Equation (2), and a derivative $f_1'(Y1)$ of the quadratic curve $f_1(Y)$ of Equation (1) is identical to a derivative $f_1'(Y1)$ of the line $f_1(Y)$ of Equation (2). Therefore, the backlight correction curve acquisition unit 24 can decide the coefficients $\alpha1$ and $\beta1$ and can define the function $f_1(Y)$ over the entire gradation range of the luminance Y.

Figure 10:
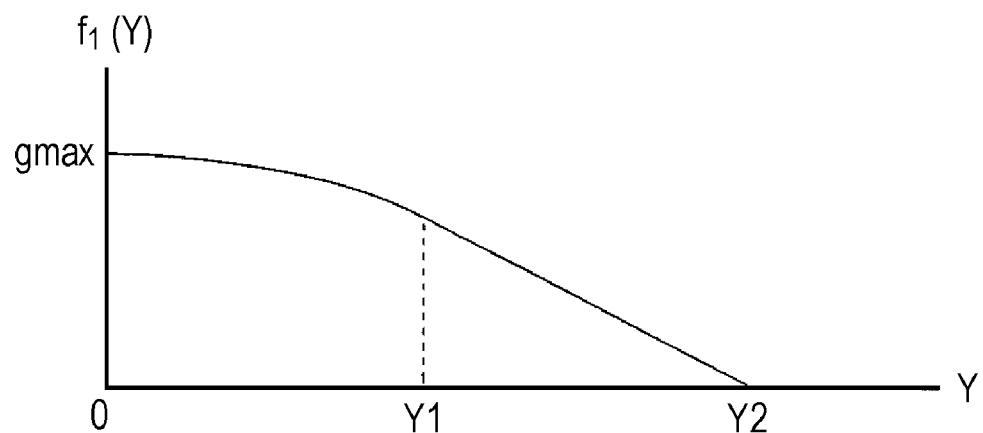
FIG. 10 is a diagram showing a function for calculation of a reference correction amount.

FIG. 10 shows an example of the function $f_1(Y)$ defined by the backlight correction curve acquisition unit 24. The backlight correction curve acquisition unit 24 inputs the luminance Yf to the function $f_1(Y)$, and acquires an output value $f_1(Yf)$ as the reference correction amount g.

In S620, the backlight correction curve acquisition unit 24 adjusts the magnitude of the reference correction amount g on the basis of the luminance difference Yd. As the luminance difference Yd is smaller, the backlight correction curve acquisition unit 24 decreases the reference correction amount g. In the following description, the reference correction amount g after adjustment is represented by a correction amount g'. In S620, the backlight correction curve acquisition unit 24 defines a function $f_2(d)$ for obtaining the correction amount g'. That is, the relationship $g'=f_2(d)$ is established. The function $f_2(d)$ is a function that forms the gradation interval $0 \leq d \leq D1$ and the gradation interval $D1 \geq d \leq D2$ from among the possible gradation interval −255 to 255 of the luminance difference Yd (for convenience, the luminance difference is represented by d), by a line and a quadratic curve, respectively. The function $f_2(d)$ is expressed as follows.

$$d<0, f_2(d)=0 \quad (4)$$

$$0 \leq d \leq D1, f_2(d)=\alpha 2 \cdot d \quad (5)$$

$$D1 \leq d \leq D2, f_2(d)=g-\beta 2 \cdot (D2-d)^2 \quad (6)$$

$$D2 \leq d, f_2(d)=g \quad (7)$$

The values D1 and D2 are derived through a preliminary test or the like, and in this embodiment, D1=75 and D2=150.

When d=D1, the quadratic curve $f_2(D1)$ of Equation (6) is identical to the line $f_2(D1)$ of Equation (5), and a derivative $f_2'(D1)$ of the quadratic curve $f_2(d)$ of Equation (6) is identical to a derivative $f_2'$ (D1) of the line $f_2(d)$ of Equation (5). Therefore, the backlight correction curve acquisition unit 24 can decide the coefficients $\alpha 2$ and $\beta 2$ and can define the function $f_2(d)$ over the entire possible gradation range of the luminance difference d.

Figure 11:
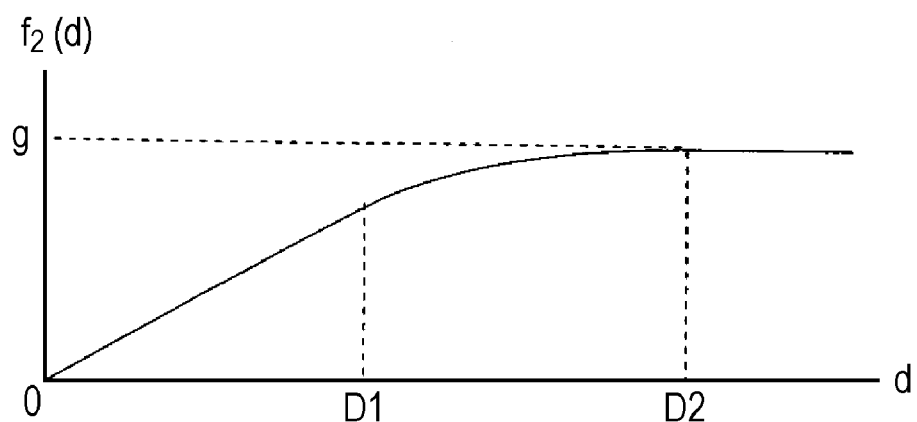
FIG. 11 is a diagram showing a function for calculation of a correction amount.

FIG. 11 shows an example of the function $f_2(d)$ defined by the backlight correction curve acquisition unit 24. The backlight correction curve acquisition unit 24 inputs the luminance difference Yd to the function $f_2(d)$, and acquires an output value $f_2$(Yd) as a correction amount g'. As will be apparent from FIG. 11, when the luminance difference Yd is equal to or greater than D2, the correction amount g' is identical to the reference correction amount g.

In S630, the backlight correction curve acquisition unit 24 specifies a plurality of points (coordinates) defining the shape of the backlight correction curve F1 on the xy plane. In this case, the backlight correction curve acquisition unit 24 specifies a correction point P1 represented by coordinate (x1,y1), an adjustment point P2 represented by coordinate (x2,y2), and a convergence point P3 represented by coordinate (x3,y3) on the basis of the luminance Yf or the correction amount g'.

The backlight correction curve acquisition unit 24 sets the correction point P1 as the input gradation value x1=Yf and the output gradation value y1=x1+g'. That is, in order to generate the backlight correction curve F1 that causes an increase of the brightness Yf of the skin representative color by the correction amount g', the correction point P1 is specified. The value x1 may preliminarily have an upper limit (for example, 64) and a lower limit (for example, 32), and the backlight correction curve acquisition unit 24 may specify the value x1 in the range from the upper limit to the lower limit. Next, the backlight correction curve acquisition unit 24 sets the input gradation value x2 of the adjustment point P2 as x2=x1+$\alpha$3. The coefficient $\alpha$3 is a constant number. The adjustment point P2 is a point that is used to adjust a bend of the backlight correction curve F1 in accordance with the position of the correction point P1, and the input gradation value x2 is kept at a predetermined gap from the input gradation value x1 of the correction point P1. In this embodiment, for example, $\alpha$3=10. The backlight correction curve acquisition unit 24 also specifies the output gradation value y2 of the adjustment point P2 in accordance with the following predetermined function with the correction point P1(x1,y1) and the input gradation value x2 of the adjustment point P2 as parameters.

$$y2=f_3(x1,x2,y1) \quad (8)$$

Next, the backlight correction curve acquisition unit 24 determines the input gradation value x3 of the convergence point P3. The convergence point P3 is a point for convergence of the backlight correction curve F1 on the line F0 in a natural way on the high gradation side than the adjustment point P2, and the input gradation value x3 is specified by the following predetermined function with the input gradation value x1 of the correction point P1 and the correction amount g' as parameters.

$$x3=f_4(x1,g') \quad (9)$$

The backlight correction curve acquisition unit 24 also specifies the output gradation value y3 of the convergence point P3 by the following predetermined function with the input gradation value x3 of the convergence point P3 as a parameter.

$$y3=f_5(x3) \quad (10)$$

The functions $f_3$, $f_4$, and $f_5$ are functions that are derived through a preliminary test and stored in, for example, the internal memory 12.

FIG. 8 shows the correction point P1(x1,y1), the adjustment point P2(x2,y2) and the convergence point P3(x3,y3) that are specified in the above-described manner. After the correction point P1(x1,y1), the adjustment point P2(x2,y2), and the convergence point P3(x3,y3) are specified, in S640, the backlight correction curve acquisition unit 24 interpolates the points (x1,y1), (x2,y2), and (x3,y3) and both ends (0,0) and (255,255) of the line F0 by a predetermined interpolation method to generate the backlight correction curve F1. The backlight correction curve acquisition unit 24 generates the backlight correction curve F1 by, for example, spline interpolation.

It can be said that the so-generated backlight correction curve F1 has a shape in which a part of the curve in the low gradation area (the output gradation value y1 of the correction point P1 corresponding to the luminance Yf) is moved (shifted) upward by the correction amount g' decided on the basis of the luminance difference Yd. The lower the luminance Yf, the larger becomes the degree of shift of the output gradation value y1 (the magnitude of the correction amount g'). For this reason, the backlight correction curve F1 is suited to brighten the face area SA that is dark in the input image. Meanwhile, it can be said that, when the luminance difference Yd is low, the input image including the background is overall dark. Accordingly, the larger the luminance difference Yd, the larger becomes the degree of shift of the output gradation value y1. When the luminance difference Yd is small, the degree of backlight correction is restrained. When the luminance difference Yd is small and the input image is overall dark, the degree of backlight correction is restrained, and accordingly a degree of color balance correction increases, as described below. Therefore, an image to be finally obtained has constantly appropriate brightness.

In S700, the CB correction curve acquisition unit 25 generates a CB correction curve F2 according to the backlight correction curve F1 generated in S600. In this embodiment, the image processing unit 20 is configured such that, since color balance correction is executed for the input image after backlight correction is executed, the degree of color balance correction changes in accordance with the degree of backlight correction. Specifically, the CB correction curve acquisition unit 25 inputs the gradation value for every RGB of the skin representative color to the backlight correction curve F1 to correct the gradation value for every RGB of the skin representative color. RGB of the skin representative color after correction by the backlight correction curve F1 is represented by Rf'Gf'Bf'. Next, the CB correction curve acquisition unit 25 acquires a gradation value RsGsBs (reference value), which is preliminarily stored in the internal memory 12 or the like as an ideal value for color balance correction of a flesh color, and calculates differences $\Delta R=Rs-Rf'$, $\Delta G=Gs-Gf'$, and $\Delta B=Bs-Bf'$ between Rf'Gf'Bf' and RsGsBs. The CB correction curve acquisition unit 25 generates tone curves F2R, F2G, and F2B for color balance correction for every RGB on the basis of the differences ΔR, ΔG, and ΔB.

Figure 12A:
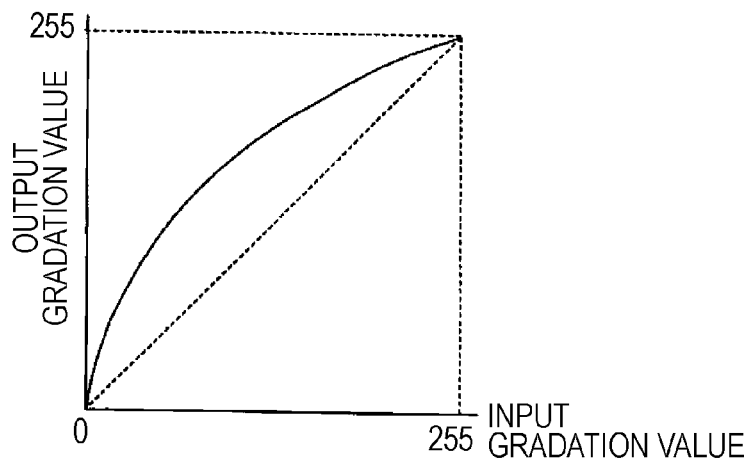
FIGS. 12A to 12B are diagrams showing a CB correction curve.
Figure 12B:
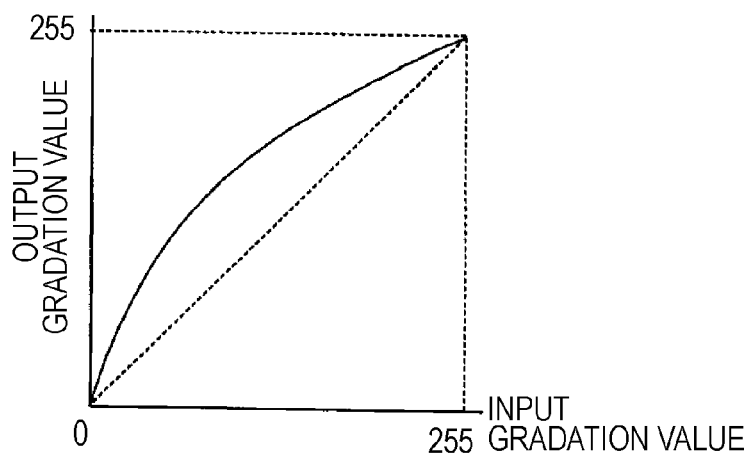
Figure 12C:
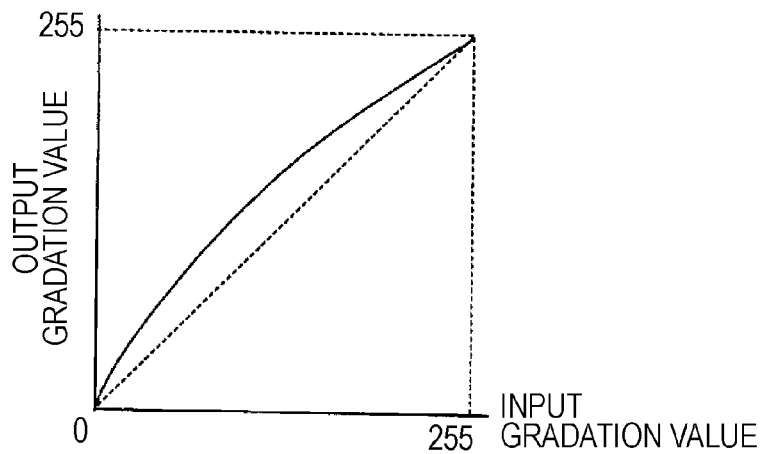

FIGS. 12A to 12C show the tone curves F2R, F2G, and F2B, respectively. The tone curve F2R is a curve in which when the input gradation value=Rf', the relationship in which the output gradation value=Rs is established. The tone curve F2G is a tone curve in which when the input gradation value=Gf', the relationship in which the output gradation value=Gs is established. The tone curve F2B is a tone curve in which when the input gradation value=Bf', the relationship in which the output gradation value=Bs is established. That is, when the increase ratio of RGB of the skin representative color by correction using the backlight correction curve F1 is large, the degree of correction (the degree of swelling of the curve) in each of the tone curves F2R, F2G, and F2B decreases. To the contrary, when the increase ratio of RGB of the skin representative color by correction using the backlight correction curve F1 is small, the degree of correction in the tone curves F2R, F2G, and F2B increases. In this embodiment, the tone curves F2R, F2G, and F2B are collectively called the CB correction curve F2.

4. Correction Processing

After the backlight correction curve F1 and the CB correction curve F2 are generated, in S800, the backlight correction unit 26 performs backlight correction for the dark portion of image data D, and in S900, the CB correction unit 27 performs color balance correction for the entire image data D. The sequence of S600 to S900 is not limited to the sequence shown in FIG. 2. For example, after the backlight correction curve F1 is generated (S600), backlight correction may be performed (S800), and after the CB correction curve F2 is generated (S700), color balance correction may be performed (S900).

Figure 13:
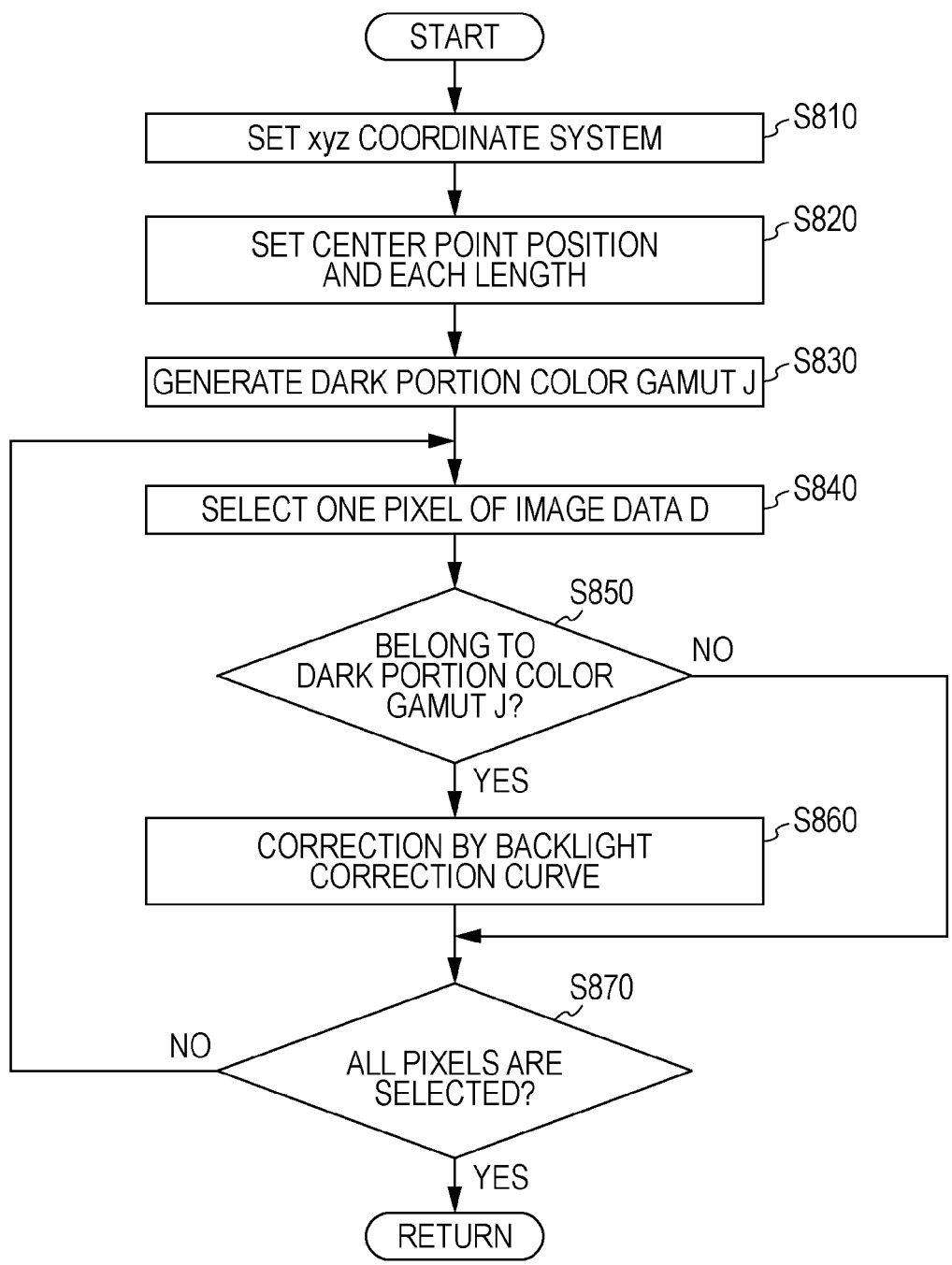
FIG. 13 is a flowchart showing the details of a backlight correction processing.

FIG. 13 is a flowchart showing the details of the processing in S800.

In S810 to S830, the backlight correction unit 26 generates a color gamut for definition of the range of the dark portion of image data D (called a dark portion color gamut J) in a predetermined calorimetric system. In this embodiment, a color solid that has a substantially elliptical shape toward the gray axis direction in the RGB calorimetric system, in which the three axes of RGB go straight to each other, is generated as the dark portion color gamut J.

Figure 14:
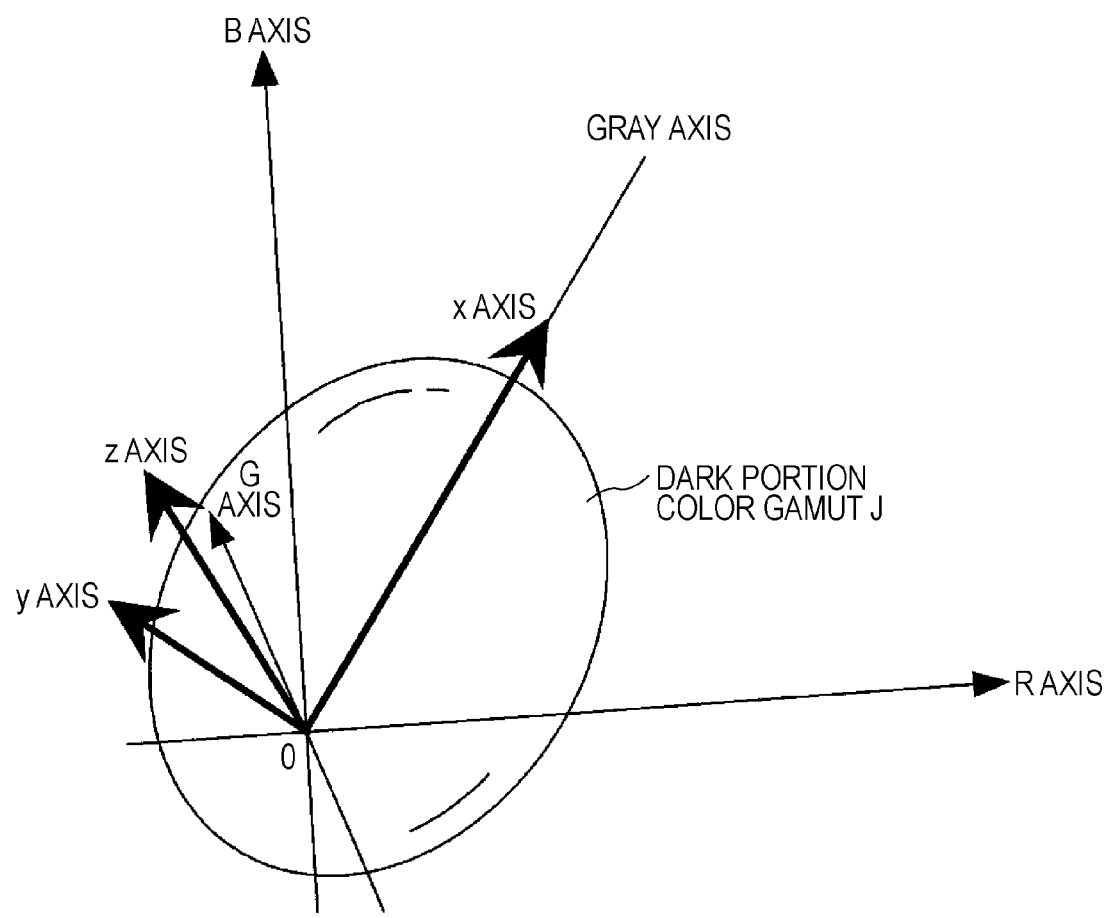
FIG. 14 is a diagram showing a dark portion color gamut.

FIG. 14 shows an example of the dark portion color gamut J generated by the backlight correction unit 26. Hereinafter, a sequence to generate the dark portion color gamut J will be described. In S810, the backlight correction unit 26 sets an xyz coordinate system, one axis of which is identical to the gray axis of the RGB calorimetric system, as the coordinate system for definition of the dark portion color gamut J.

Specifically, the backlight correction unit 26 sets the xyz coordinate system with the origin 0 identical to the origin 0 of the RGB calorimetric system, and the x axis, the y axis, and the z axis identical to the R axis, the G axis, and the B axis, respectively. Next, the backlight correction unit 26 rotates the xyz coordinate system by 45 degrees around the z axis in a direction from the R axis toward the G axis, and then rotates the xyz coordinate system around the y axis such that the x axis is identical to the gray axis of the RGB calorimetric system. As a result, the xyz coordinate system with the x axis identical to the gray axis of the RGB calorimetric system is set. FIG. 14 also shows the relationship between the so-set xyz coordinate system and the RGB calorimetric system.

In S820, the backlight correction unit 26 sets the position of a center point OJ of the dark portion color gamut J and the length of the dark portion color gamut J in each of the xyz directions in the xyz coordinate system.

Figure 15:
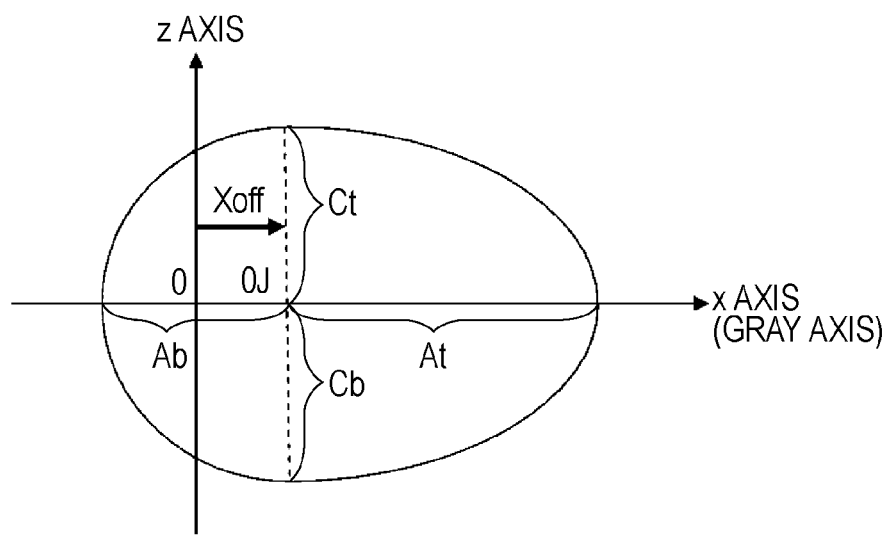
FIG. 15 is a sectional view of a dark portion color gamut.

FIG. 15 shows a section of the dark portion color gamut J parallel to the xz plane with the maximum length of the dark portion color gamut J in any of the x and z directions.

Figure 16:
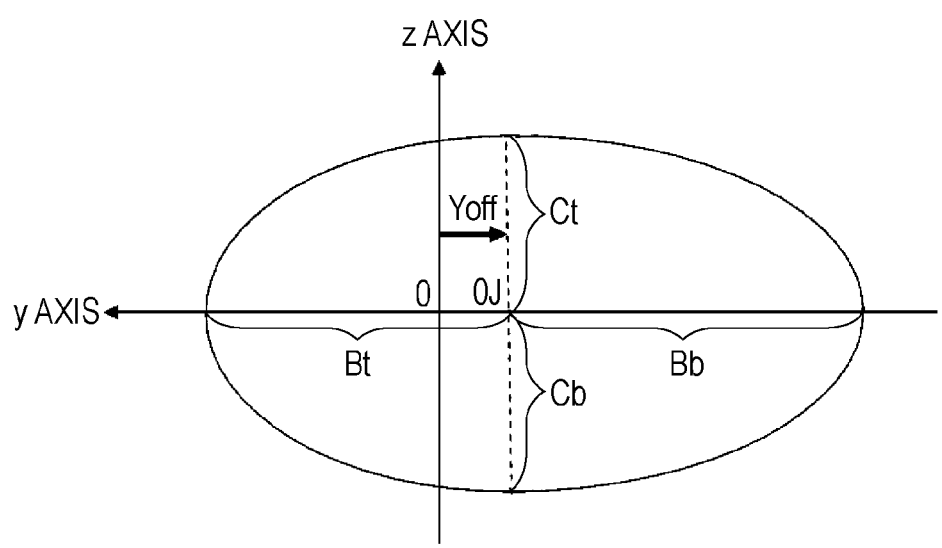
FIG. 16 is a sectional view of a dark portion color gamut.

FIG. 16 shows a section of the dark portion color gamut J parallel to the yz plane (a section perpendicular to the x axis) with the maximum length of the dark portion color gamut J in any of the y and z directions. The backlight correction unit 26 sets a shift amount xoff of the center point OJ from the origin 0 of the xyz coordinate system toward the positive x-axis side as xoff, a shift amount yoff of the center point OJ from the origin 0 to the positive y-axis side, a length At from the center point OJ toward the positive x-axis side, a length Ab from the center point OJ to the negative x-axis side, a length Bt from the center point OJ toward the positive y-axis side, a length Bb from the center point OJ toward the negative y-axis side, a length Ct from the center point OJ toward the positive z-axis side, and a length Cb from the center point OJ toward the negative z-axis side.

Figure 17:
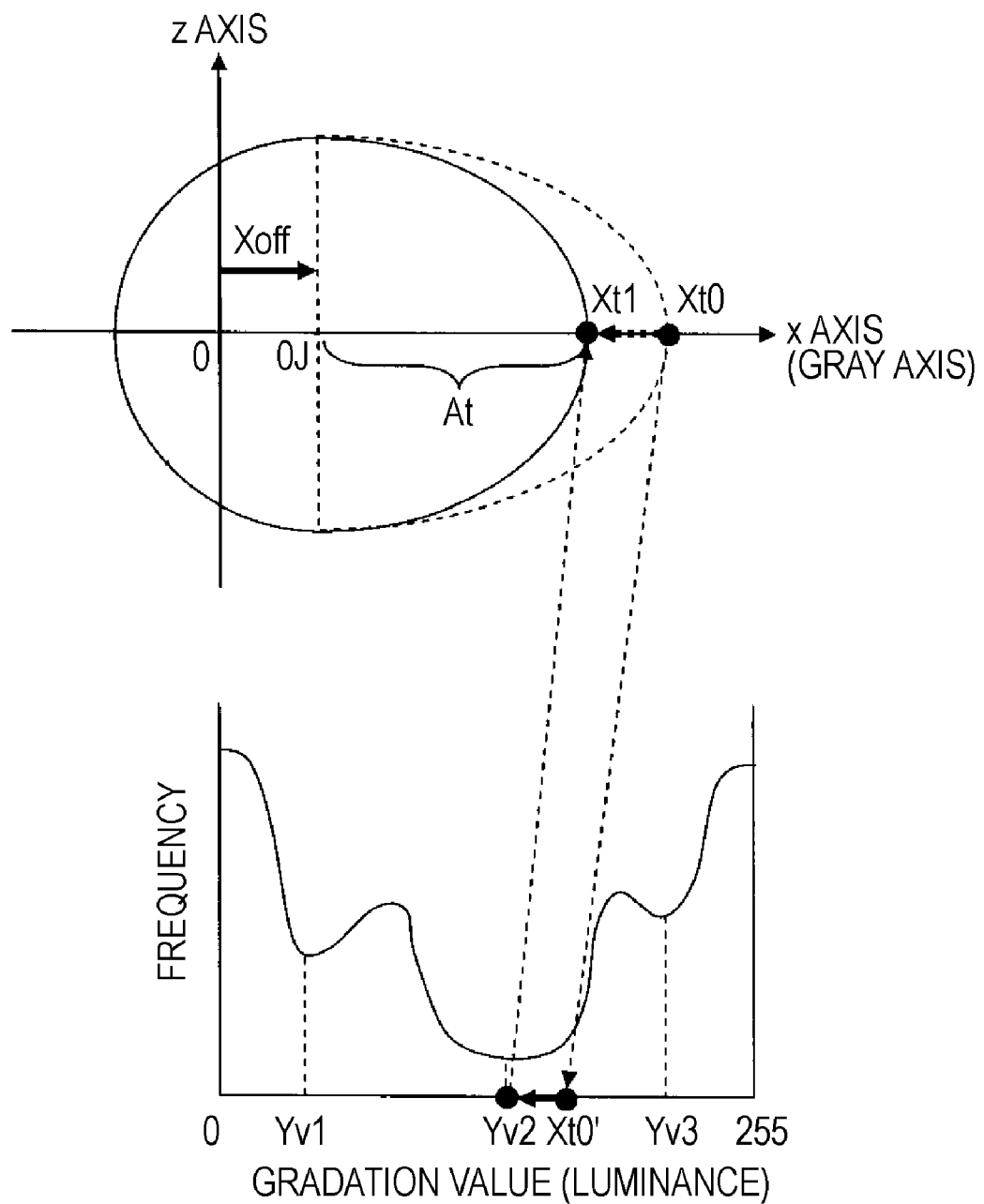
FIG. 17 is a diagram showing an example of decision of a length of a dark portion color gamut.

In this embodiment, the backlight correction unit 26 sets both shift amounts xoff and yoff to 0. Therefore, the center point OJ is identical to the origin of the xyz coordinate system (the origin of the RGB colorimetric system). FIGS. 15, 16, and 17 (described below) show a case where neither the shift amount xoff nor the shift amount yoff is 0. In this embodiment, with respect to the lengths Ab, Bt, Bb, Ct, and Cb, fixed lengths are prescribed in a predetermined memory area of the internal memory 12 or the like as information, and the backlight correction unit 26 sets the prescribed fixed lengths as the lengths Ab, Bt, Bb, Ct, and Cb, respectively. In this embodiment, the relationship Bt=Bb and Ct=Cb is established. Meanwhile, the length At from the center point OJ toward the plus x-axis side is not prescribed. The length At is a value that defines the upper limit in the gray axis direction of the dark portion color gamut J (the upper limit of brightness of the dark portion color gamut J). For this reason, in this embodiment, with respect to the length At, a fixed value is not set, and the backlight correction unit 26 sets the length At in accordance with the state of image data D.

FIG. 17 is a diagram illustrating a sequence to set the length At that is executed by the backlight correction unit 26. FIG. 17 shows, on the upper side, a section of the dark portion color gamut J parallel to the xz plane with the maximum length of the dark portion color gamut J in the x and z directions, and shows, on the lower side, the luminance distribution that is obtained from the pixels sampled with a predetermined extraction ratio for the entire range of image data D. The backlight correction unit 26 may generate the luminance distribution in S820, or if the luminance distribution of image data D is generated by the representative color calculation unit 22 in S310 described above, may acquire the luminance distribution generated by the representative color calculation unit 22.

In the sequence to set the length At, first, the backlight correction unit 26 sets an initial upper limit point Xt0 on the x axis (gray axis). The initial upper limit point Xt0 is a point that corresponds to the gradation value within a predetermined input gradation range with a low change rate of the output gradation value by the backlight correction curve F1. As shown in FIG. 8, the change rate (slope) of the output gradation value in the backlight correction curve F1 is schematically large in the range of the input gradation values 0 to x2 including the input gradation value x1 and small in the range of the input gradation values x2 to x3, as compared with the change rate in the line F0, and substantially becomes equal to the line F0 at the input gradation value x3 and later.

Accordingly, the input gradation range x2 to x3 corresponds to the input gradation range with the low change rate of the output gradation value by the backlight correction curve F1. Thus, the backlight correction unit 26 sets a position on the gray axis corresponding to a gradation value within the input gradation range x2 to x3, in particular, a gradation value near the input gradation value x3 as the initial upper limit point Xt0.

More specifically, the backlight correction unit 26 specifies the initial upper limit point Xt0 in accordance with the following predetermined function.

$$Xt0 = f_6(x1, g') \cdot \sqrt{3} \tag{11}$$

As described above, when the input gradation value x3 is determined by the input gradation value x1 and the correction amount g', the initial upper limit point Xt0 is also specified by the function $f_6(x1,g')$ with the input gradation value x1 and the correction amount g' as parameters. The function $f_6$ is a function that is derived through a preliminary test or the like and stored in, for example, the internal memory 12.

The term $\sqrt{3}$ means the square root of 3. The reason for multiplication of $f_6(x1,g')$ by $\sqrt{3}$ is to align the possible range of the function $f_6(x1,g')$ with the range of the gray axis. The backlight correction unit 26 may set the value through multiplication of the input gradation value x3 by $\sqrt{3}$ as Xt0.

After the initial upper limit point Xt0 is set on the gray axis (see the upper side of FIG. 17), the backlight correction unit 26 next normalizes the initial upper limit point Xt0 to the gradation value of the luminance distribution, and sets the gradation value after normalization as an initial upper limit gradation value Xt0'. That is, since the range of the gray axis is $\sqrt{3}$ times larger than the range (0 to 255) of the luminance distribution, the backlight correction unit 26 acquires the initial upper limit gradation value Xt0' through multiplication of the initial upper limit point Xt0 by $(1/\sqrt{3})$. On the lower side of FIG. 17, the initial upper limit gradation value Xt0' is described within the gradation range of the luminance distribution.

Next, the backlight correction unit 26 specifies a trough in the luminance distribution. That is, the backlight correction unit 26 finds a minimum value in the luminance distribution and specifies a gradation value (luminance) corresponding to the minimum value. FIG. 17 shows a case where there are three troughs in the luminance distribution, and the gradation values corresponding to the troughs are represented by gradation values Yv1, Yv2, and Yv3, respectively. As described above, in the case of a backlight image, the luminance distribution concentrates on the low gradation side and the high gradation side and a trough tends to occur between the low gradation side and the high gradation side. In this case, the number of troughs is not limited to one. Thus, the backlight correction unit 26 specifies all troughs in the luminance distribution as described above.

The backlight correction unit 26 specifies a gradation value closest to the initial upper limit gradation value Xt0' from among gradation values corresponding to the troughs on the low gradation side than the initial upper limit gradation value Xt0'. Then, the initial upper limit gradation value Xt0' is changed to the specified gradation value. In the example of FIG. 17, the gradation values Yv1 and Yv2 from among the gradation values Yv1, Yv2, and Yv3 corresponding to the troughs in the luminance distribution are present on the low gradation side lower than the initial upper limit gradation value Xt0', and of these, the gradation value Yv2 is closest to the initial upper limit gradation value Xt0'. For this reason, the initial upper limit gradation value Xt0' is changed to the gradation value Yv2. Meanwhile, when the difference between the initial upper limit gradation value Xt0' and the gradation value of the trough closest to the low gradation side than the initial upper limit gradation value Xt0' exceeds a prescribed threshold value, the backlight correction unit 26 does not change the initial upper limit gradation value Xt0'. This is to prevent the upper limit of brightness of the dark portion color gamut J from being excessively lowered.

Next, the backlight correction unit 26 specifies the value, which is obtained through multiplication of the gradation value after change (the gradation value Yv2) by $\sqrt{3}$, on the gray axis. In this embodiment, the value that is obtained through multiplication of the gradation value after change by $\sqrt{3}$ is represented by an upper point Xt1 (see the upper side of FIG. 17). Then, the backlight correction unit 26 sets the distance between the center point OJ and the upper limit point Xt1 in the x axis direction as the length At. When the initial upper limit gradation value Xt0' is not changed, the backlight correction unit 26 sets the distance between the center point OJ and the initial upper limit point Xt0 in the x axis direction as the length At.

In S830, the backlight correction unit 26 generates the dark portion color gamut J in the xyz coordinate system on the basis of the position of the center point OJ and the length in each of the xyz directions, which are set in S820. That is, the backlight correction unit 26 generates a substantially elliptical (substantially oval) solid that includes the xz section, which is parallel to the xz plane and has, with respect to the center point OJ, the length At toward the positive x-axis side, the length Ab toward the negative x-axis side, the length Ct toward the positive z-axis side, and the length Cb toward the negative z-axis side, and the yz section, which is parallel to the yz plane and has, with respect to the center point OJ, the length Bt toward the positive y-axis side, the length Bb toward the negative y-axis side, the length Ct toward the positive z-axis side, and the length Cb toward the negative z-axis side, and sets the solid as the dark portion color gamut J. The xz section is parallel to the xz plane of the dark portion color gamut J and has the maximum area from among the sections parallel to the xz plane. The yz section is parallel to the yz plane of the dark portion color gamut J and has the maximum area from among the sections parallel to the yz plane.

After S840, the backlight correction unit 26 performs backlight correction only for the pixels belonging to the dark portion color gamut J from among the pixels of image data D. That is, in S840, the backlight correction unit 26 selects one pixel from the pixels constituting image data D, and in S850, determines whether or not RGB data of the pixel selected in S840 belongs to the dark portion color gamut J.

If it is determined in S850 that RGB data of the pixel belongs to the dark portion color gamut J, the backlight correction unit 26 progress to S860. Meanwhile, if it is determined that RGB data of the pixel does not belong to the dark portion color gamut J, the backlight correction unit 26 skips S860 and progresses to S870.

In S860, the backlight correction unit 26 corrects the pixel selected in S840 by using the backlight correction curve F1. Specifically, the gradation value for every RGB of the pixel is input to the backlight correction curve F1 and corrected. RGB after correction by the backlight correction curve F1 in S860 is represented by R'G'B'.

In S860, the backlight correction unit 26 may change the degree of correction for the pixel in accordance with the distance between the center axis of the dark portion color gamut J in the gray axis direction and the pixel to be corrected at that time.

Figure 18:
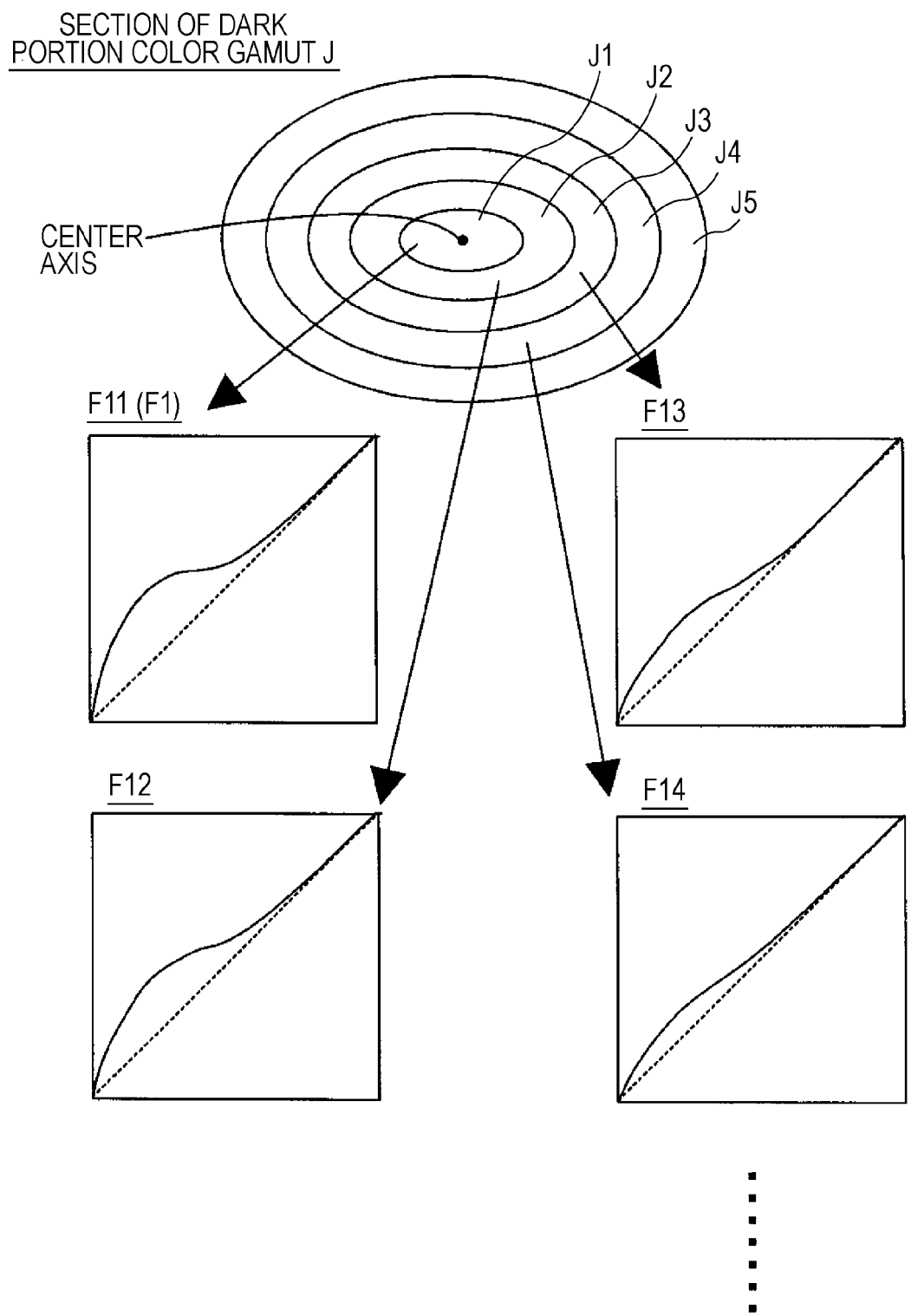
FIG. 18 is a diagram showing a correspondence relationship between each area of a dark portion color gamut and each backlight correction curve.

FIG. 18 shows the correspondence relationship between the section of the dark portion color gamut J at a surface perpendicular to the center axis of the dark portion color gamut J in the gray axis direction and each backlight correction curve. As shown in FIG. 18, the backlight correction unit 26 divides the area of the dark portion color gamut J into a plurality of areas J1, J2, J3 . . . in accordance with the distance from the center axis of the dark portion color gamut J. As described above, in this embodiment, since the shift amount yoff of the center point OJ of the dark portion color gamut J in the y axis direction is 0, the center axis of the dark portion color gamut J is identical to the gray axis. The backlight correction unit 26 generates a plurality of backlight correction curve F11, F12, F13 . . . corresponding to the areas J1, J2, J3 . . . such that, for a correction curve corresponding to an area away from the center axis, the degree of correction is weakened. Specifically, the backlight correction curve F1 generated in S600 is associated with the area closest to the center axis (an area J1 including the center axis) (that is, the backlight correction curve F1=the backlight correction curve F11). With respect to the areas J2, J3 . . . away from the center axis, the backlight correction curves F12, F13 . . . are generated while the degree of bending of the curve is gradually loosened on the basis of the shape of the backlight correction curve F1 and associated with the areas J2, J3, . . . . In S860, the backlight correction unit 26 performs pixel correction by using the backlight correction curve corresponding to an area to which the pixel to be corrected belongs (any one of the areas J1, J2, J3 . . . ).

If the degree of backlight correction is gradually weakened in accordance with the distance from the center axis of the dark portion color gamut J, at the time of backlight correction, occurrence of a loss in the gradation property (gradation breakdown) between the color belonging to the dark portion color gamut J of image data D and the color not belonging to the dark portion color gamut J can be accurately suppressed. In S870, the backlight correction unit 26 determines whether or not all the pixels belonging to image data D are selected one by one in S840, and if all the pixels are selected, the processing of FIG. 13 ends. Meanwhile, when there is a pixel that belongs to image data D and is not selected in S840 yet, the backlight correction unit 26 returns to S840. In S840, an unselected pixel is selected, and the processing subsequent to S850 is repeated.

As described above, in this embodiment, only the pixels, the color of which belongs to the dark portion color gamut J, from among the pixels constituting image data D are corrected by the backlight correction curve F1. In particular, the position on the gray axis corresponding to the trough in the luminance distribution of image data D is set as the upper limit of the dark portion color gamut J in the gray axis direction. For this reason, only the pixels of the dark portion in image data D, which is a backlight image, are reliably subject to backlight correction, and a portion which does not need to be subject to backlight correction is prevented from being subject to backlight correction. In this embodiment, the position on the gray axis corresponding to the trough in the luminance distribution, in particular, the trough on the low gradation side than the gradation value (the initial upper limit gradation value Xt0') within the input gradation range with the low change rate of the output gradation value by the backlight correction curve F1 is set as the upper limit of the dark portion color gamut J in the gray axis direction. For this reason, a curve interval with a low change rate of the output gradation value (for example, an interval from the adjustment point P2 to the convergence point P3) from among the curve intervals constituting the backlight correction curve F1 is not substantially used in backlight correction. As a result, the gradation of a portion corrected by the backlight correction curve F1 can be significantly prevented from being broken (contrast can be prevented from being lowered).

In S900, by using the CB correction curve F2, the CB correction unit 27 performs correction for image data D after backlight correction is performed for the dark portion in S800. The CB correction unit 27 inputs the gradation values of RGB of all the pixels constituting the image data D (R'G'B' with respect to the pixels subjected to backlight correction) to the tone curves F2R, F2G, and F2B, respectively, to individually correct the element colors of the respective pixels. As a result, the color balance of the entire image data D is adjusted, and a variation in the distribution characteristic between RGB in image data D is reduced. In addition, the color of the skin portion of the face image significantly becomes close to an ideal flesh color. After correction ends, the image processing unit 20 ends the flowchart of FIG. 2. Thereafter, the image processing unit 20 may perform other kinds of image processing for image data D, and may transfer image data D to the print control unit 40.

5. Modification

The contents of this embodiment are not limited to those described above, and various modifications described below may be implemented.

The WB correction unit 28 may perform white balance correction for image data D before backlight correction and color balance correction are performed. For example, the WB correction unit 28 performs white balance correction after S100 and before S200. The white balance correction means a processing for correction of each pixel of image data D so as to suppress a variation between the maximum values of RGB in image data D. The WB correction unit 28 first samples the pixels from image data D, and generates a frequency distribution (histogram) for every RGB in the sampled pixels.

Figure 19A:
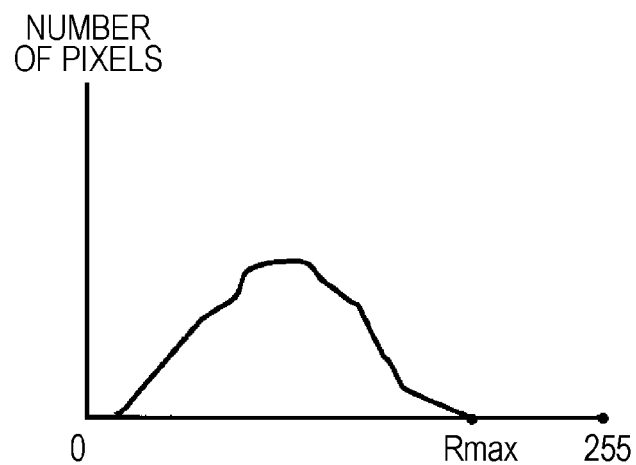
FIGS. 19A to 19C are diagrams showing histograms for element colors.
Figure 19B:
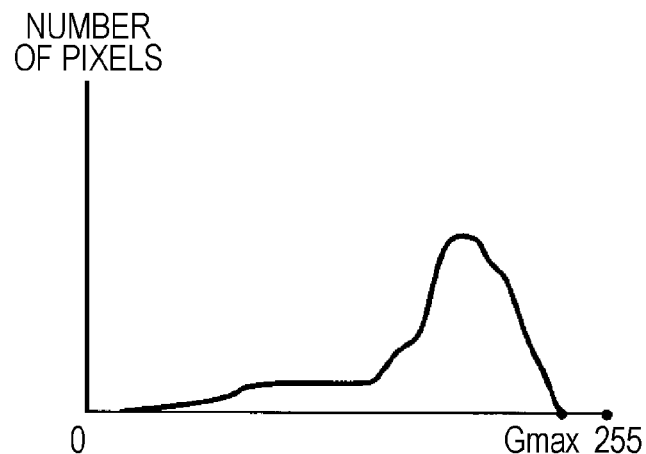
Figure 19C:
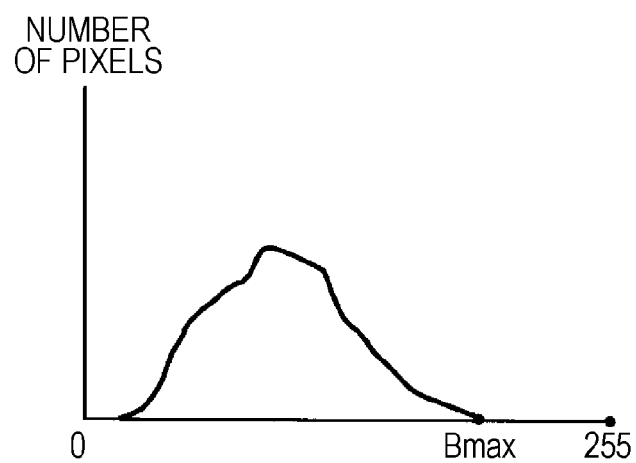

FIGS. 19A, 19B, and 19C illustrate histograms for RGB generated by the WB correction unit 28. The WB correction unit 28 selects one value (for example, Gmax) from among the maximum values Rmax, Gmax, and Bmax of the respective histograms, and calculates the differences ΔGR=Gmax−Rmax and ΔGB=Gmax−Bmax between the selected maximum value Gmax and the maximum values Rmax and Bmax of other element colors. Then, the WB correction unit 28 adds, as an offset amount, the difference ΔGR to R of a pixel, R of which is the maximum value Rmax, and adds an offset amount based on the level of R (for example, an offset amount obtained through multiplication of the difference ΔGR by a coefficient ranging from 0 to 1 in accordance with the level of R) to R of a different pixel, R of which is not the maximum value Rmax. Similarly, the WB correction unit 28 adds, as an offset amount, the difference ΔGB to B of a pixel, B of which is the maximum value Bmax, and adds an offset amount based on the level of B (for example, an offset amount obtained through multiplication of the difference ΔGB by a coefficient ranging from 0 to 1 in accordance with the level of B) to B of a different pixel, B of which is not the maximum value Bmax.

With such addition, at least a variation between the maximum values of RGB constituting image data D is corrected (white balance is adjusted). A specific method for white balance correction by the WB correction unit 28 is not limited to the above-described method. As shown in FIG. 8, the backlight correction curve F1 for backlight correction has a special conversion characteristic that causes an increase by a partial gradation range only, and causes a significant change with respect to the input image. For this reason, if backlight correction is performed for an input image in which white balance is intrinsically broken, consequently, the breakdown of white balance is expanded, and the colors of an image are collapsed. Therefore, before backlight correction by the backlight correction unit 26, the WB correction unit 28 performs white balance correction for the input image to adjust the white balance of the image, thereby preventing the colors of the image from being broken as the result of backlight correction.

In the above description, in S600, the backlight correction curve acquisition unit 24 calculates the correction amount g' on the basis of the luminance Yf or the luminance difference Yd, and obtains three points P1, P2, and P3, thereby generating the backlight correction curve F1. Alternatively, in S600, the backlight correction curve acquisition unit 24 may select one correction curve from among a plurality of preliminarily generated backlight correction curves F1 having different shapes on the basis of the luminance Yf or the luminance difference Yd. For example, it is assumed that the internal memory 12 preliminarily stores a plurality of backlight correction curve F1 having different degrees of correction. Then, the backlight correction curve acquisition unit 24 selects one backlight correction curve F1 having an optimum degree of correction for elimination of the luminance difference Yd on the basis of the magnitude of the luminance difference Yd obtained from the input image. In S800, the backlight correction curve F1 selected in S600 is used. With this configuration, the backlight correction curve F1 can be easily acquired without needing any complex arithmetic operations.

In the above description, from among the parameters for definition of the dark portion color gamut J, the shift amounts xoff and yoff, and the lengths Ab, Bt, Bb, Ct, and Cb are fixed values. Alternatively, the parameters may be appropriately changed in accordance with the state of image data D or the like. In terms of correction of a backlight image in which a face image is dark, it is effective that the dark portion color gamut J is a color gamut containing a lot of flesh color. The shift amount yoff of the center point OJ toward the plus y-axis side may be set to a predetermined negative value. If the shift amount yoff is a predetermined negative value, the dark portion color gamut J contains a lot of flesh-like colors in the RGB calorimetric system, as compared with a case where, as described above, the center axis is identical to the gray axis. As a result, if the pixels subject to backlight correction are restricted on the basis of the dark portion color gamut J, dark pixels in image data D and pixels corresponding to the skin portion of the face image can be accurately set to a target subject to backlight correction.

6. Summary

As described above, according to this embodiment, the printer 10 generates the backlight correction curve F1, the correction amount of which is determined on the basis of the difference (luminance difference Yd) between brightness of the face area SA detected from image data D (brightness of the skin representative color calculated from the face area SA) and brightness of the background area, or the brightness of the face area SA. Then, the printer 10 corrects only the pixels, which belong to the dark portion color gamut J, in which the upper limit of brightness is defined in accordance with the position of the trough of the luminance distribution of image data D, from among the pixels constituting image data D by the backlight correction curve F1. For this reason, only the brightness of the dark portion in image data D is corrected with the optimum degree of correction according to the luminance difference Yd or the brightness of the skin representative color, and the colors of the pixels out of the dark portion in image data D are maintained without causing whiteout.

The printer 10 corrects each element color of the skin representative color by the backlight correction curve F1, and generates the CB correction curve F2 for every element color on the basis of each element color of the skin representative color after correction. The printer 10 corrects the dark portion of image data D by the backlight correction curve F1 in the above-described manner, and then corrects each element color by the CB correction curve F2 for all the pixels of image data D. That is, while the balance between the element colors of image data D may vary only with backlight correction by the backlight correction curve F1, if color balance correction by the CB correction curve F2 is performed, a very ideal image in which a shortage in lightness of the dark portion is eliminated and the color balance is adjusted can be obtained. The CB correction curve F2 is generated through comparison between the representative color corrected by the backlight correction curve F1 and a prescribed reference value as the ideal value of the flesh color, there is no case where color balance correction after backlight correction is excessively performed. Such combination of backlight correction and the color balance correction is particularly effective for a backlight image in which a face image is included in an image area.

The sequence of backlight correction and color balance correction is important. That is, if color balance correction is performed for the input image earlier than the backlight correction, since the degree of correction is large, whiteout may occur in the bright portion of the image, and whiteout may be kept uncorrected. In addition, if backlight correction is performed after color balance correction, the color balance of the face image or the like that is adjusted by color balance correction may be broken due to backlight correction. Therefore, in order to obtain a high-quality image, like this embodiment, it is necessary to perform color balance correction after backlight correction.

Although in this embodiment, a case where the specific image is a face image has been described, a specific image that can be detected by the configuration of the invention is not limited to a face image. That is, in the invention, various objects, such as artifacts, living things, natural things, landscapes, and the like, can be detected as the specific image. The representative color to be calculated is also a color representing a specific image as an object to be detected.

What is claimed is:

1. An image processing apparatus comprising:
   a specific image detection unit detecting an area including at least a part of a specific image in an input image;
   a representative color calculation unit calculating a representative color of the specific image on the basis of pixels belonging to the area detected by the specific image detection unit;
   a first correction curve acquisition unit acquiring a first correction curve for gradation correction on the basis of brightness of the representative color;
   a second correction curve acquisition unit correcting the representative color by the first correction curve and acquiring a second correction curve for gradation correction for every element color on the basis of the gradation value for every element color constituting the representative color after correction;
   a first correction unit correcting the gradation values of pixels, which belong to a color gamut defining a dark portion, from among pixels constituting the input image by using the first correction curve; and
   a second correction unit correcting the gradation value for every element color in each pixel constituting the input image by using the second correction curve,
   wherein the second correction curve acquisition unit calculates a difference between the gradation value for every element color constituting the representative color after correction and a predetermined reference value, and generates the second correction curve for every element color in accordance with the calculated difference for every element color.

2. The image processing apparatus according to claim 1, further comprising:
a preliminary correction unit calculating the maximum value for every element color in the input image before correction by the first correction unit and the second correction unit, and correcting each element color in the input image before correction by the first correction unit and the second correction unit so as to suppress a variation in the maximum value.

3. The image processing apparatus according to claim 1, wherein, for all the pixels of the input image including pixels corrected by the first correction unit, the second correction unit corrects the gradation value for every element color in each pixel by using the second correction curve.

4. An image processing apparatus comprising:
a specific image detection unit detecting an area including at least a part of a specific image in an input image;
a representative color calculation unit calculating a representative color of the specific image on the basis of pixels belonging to the area detected by the specific image detection unit;
a first correction curve acquisition unit acquiring a first correction curve for gradation correction on the basis of brightness of the representative color;
a second correction curve acquisition unit correcting the representative color by the first correction curve and acquiring a second correction curve for gradation correction for every element color on the basis of the gradation value for every element color constituting the representative color after correction;
a first correction unit correcting the gradation values of pixels, which belong to a color gamut defining a dark portion, from among pixels constituting the input image by using the first correction curve; and
a second correction unit correcting the gradation value for every element color in each pixel constituting the input image by using the second correction curve,
wherein the first correction curve acquisition unit shifts a part of a curve in a low gradation area upward on the basis of a difference between brightness of the representative color and brightness of a background area in the input image to generate the first correction curve which is curved convex upward in the low gradation area, approaches a line with the same input gradation value and output gradation value in an intermediate gradation area, and converges on the line from the intermediate gradation area to a high gradation area.

5. The image processing apparatus according to claim 1, wherein the first correction curve acquisition unit increases the degree of shift of the curve as the difference between a brightness of the representative color and a brightness of the background area becomes larger.

6. The image processing apparatus according to claim 1, wherein the first correction curve acquisition unit increases the degree of shift of the curve as a brightness of the representative color becomes lower.

7. An image processing apparatus comprising:
a specific image detection unit detecting an area including at least a part of a specific image in an input image;
a representative color calculation unit calculating a representative color of the specific image on the basis of pixels belonging to the area detected by the specific image detection unit;
a first correction curve acquisition unit acquiring a first correction curve for gradation correction on the basis of brightness of the representative color;
a second correction curve acquisition unit correcting the representative color by the first correction curve and acquiring a second correction curve for gradation correction for every clement color on the basis of the gradation value for every element color constituting the representative color after correction;
a first correction unit correcting the gradation values of pixels, which belong to a color gamut defining a dark portion, from among pixels constituting the input image by using the first correction curve; and
a second correction unit correcting the gradation value for every element color in each pixel constituting the input image by using the second correction curve.
wherein the first correction unit acquires a luminance distribution of the input image, specifies a gradation value corresponding to a trough in the luminance distribution, specifies a position on a gray axis of a predetermined calorimetric system corresponding to the specified gradation value, and defines a color gamut in the calorimetric system where an upper limit value in a gray axis direction is at the specified position on the gray axis.

8. The image processing apparatus according to claim 7, wherein the first correction unit specifies a gradation value corresponding to a trough in the luminance distribution on a low gradation side lower than a predetermined gradation value within a predetermined input gradation range with a low change rate of the output gradation value by the first correction curve.

9. The image processing apparatus according to claim 7, wherein the first correction unit changes the degree of correction for the pixels in accordance with a distance between a center axis in the gray axis direction of the color gamut and a pixel subject to correction.

10. The image processing apparatus according to claim 1, wherein the representative color calculation unit calculates, as the representative color, a color formed by the average value for every element color in the pixels, which belong to the area detected by the specific image detection unit and belong to a color gamut in a predetermined calorimetric system as a color gamut corresponding to the specific image.

11. The image processing apparatus according to claim 1, wherein the specific image detection unit detects an area including at least a part of a face image in the input image.

12. The image processing apparatus according to claim 4, wherein, for all the pixels of the input image including pixels corrected by the first correction unit, the second correction unit corrects the gradation value for every element color in each pixel by using the second correction curve.

13. The image processing apparatus according to claim 4, further comprising:
a preliminary correction unit calculating the maximum value for every element color in the input image before correction by the first correction unit and the second correction unit, and correcting each element color in the input image before correction by the first correction unit and the second correction unit so as to suppress a variation in the maximum value.

14. The image processing apparatus according to claim 4, wherein the representative color calculation unit calculates, as the representative color, a color formed by the average value for every element color in the pixels, which belong to the area detected by the specific image detection unit and belong to a color gamut in a predetermined calorimetric system as a color gamut corresponding to the specific image.

15. The image processing apparatus according to claim 4, wherein the specific image detection unit detects an area including at least a part of a face image in the input image.

16. The image processing apparatus according to claim 7, wherein, for all the pixels of the input image including pixels corrected by the first correction unit, the second correction unit corrects the gradation value for every element color in each pixel by using the second correction curve.

17. The image processing apparatus according to claim 7, further comprising:

a preliminary correction unit calculating the maximum value for every element color in the input image before correction by the first correction unit and the second correction unit, and correcting each element color in the input image before correction by the first correction unit and the second correction unit so as to suppress a variation in the maximum value.

18. The image processing apparatus according to claim 7, wherein the representative color calculation unit calculates, as the representative color, a color formed by the average value for every element color in the pixels, which belong to the area detected by the specific image detection unit and belong to a color gamut in a predetermined calorimetric system as a color gamut corresponding to the specific image.

19. The image processing apparatus according to claim 7, wherein the specific image detection unit detects an area including at least a part of a face image in the input image.

* * * * *